United States Patent
Sampath et al.

(10) Patent No.: US 9,300,602 B2
(45) Date of Patent: Mar. 29, 2016

(54) METHOD, DEVICE, AND APPARATUS FOR ERROR DETECTION AND CORRECTION IN WIRELESS COMMUNICATIONS

(71) Applicant: QUALCOMM Incorporated, San Diego, CA (US)

(72) Inventors: Hemanth Sampath, San Diego, CA (US); Simone Merlin, San Diego, CA (US); Vincent Knowles Jones, IV, Redwood City, CA (US); Gwendolyn Denise Barriac, Encinitas, CA (US); Bin Tian, San Diego, CA (US); Yan Zhou, San Diego, CA (US); Sameer Vermani, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 14/062,608

(22) Filed: Oct. 24, 2013

(65) Prior Publication Data
US 2014/0126580 A1 May 8, 2014

Related U.S. Application Data

(60) Provisional application No. 61/722,029, filed on Nov. 2, 2012, provisional application No. 61/844,806, filed on Jul. 10, 2013.

(51) Int. Cl.
| | |
|---|---|
| *H03M 13/00* | (2006.01) |
| *H04L 1/14* | (2006.01) |
| *H04W 4/00* | (2009.01) |
| *G06F 11/00* | (2006.01) |

(Continued)

(52) U.S. Cl.
CPC ........... *H04L 49/557* (2013.01); *H04L 1/0057* (2013.01); *H04L 1/188* (2013.01); *H04L 1/1819* (2013.01); *H04L 1/1858* (2013.01); *H04W 84/12* (2013.01)

(58) Field of Classification Search
CPC ..................................................... H04W 84/12
See application file for complete search history.

(56) References Cited

U.S. PATENT DOCUMENTS

| | | | | |
|---|---|---|---|---|
| 5,629,948 | A * | 5/1997 | Hagiwara et al. | 714/748 |
| 6,728,920 | B1 * | 4/2004 | Ebersman | 714/752 |

(Continued)

OTHER PUBLICATIONS

Argyriou A., et al., "Cross-Layer Error Control for Multimedia Streaming in Wireless/Wireline Packet-Networks," IEEE Transactions on Multimedia, vol. 10 (6), Oct. 2008, pp. 1121-1127.

(Continued)

*Primary Examiner* — Alpus H Hsu
(74) *Attorney, Agent, or Firm* — Knobbe, Martens, Olson & Bear, LLP

(57) ABSTRACT

Systems and methods for communicating in a wireless communication system are described. Various processes for detecting and correcting communication errors described. In aspect a method in a wireless communication system is provided. The method includes transmitting a first packet from a sending device to a receiving device. The method further includes listening for an acknowledgement during a first time period. The method further includes transmitting a second packet to the receiving device after a second time period, when an acknowledgement is not received during the first time period. The second packet includes one or more error-correction codes operable to recover the first packet.

13 Claims, 12 Drawing Sheets

(51) Int. Cl.
*H04L 12/939* (2013.01)
*H04L 1/18* (2006.01)
*H04L 1/00* (2006.01)
*H04W 84/12* (2009.01)

(56) References Cited

U.S. PATENT DOCUMENTS

| | | | |
|---|---|---|---|
| 6,771,674 B1* | 8/2004 | Schuster et al. | 370/537 |
| 6,785,261 B1* | 8/2004 | Schuster et al. | 370/352 |
| 8,125,941 B2* | 2/2012 | Trainin | H04W 72/1278 370/328 |
| 8,126,014 B2 | 2/2012 | Chin et al. | |
| 8,335,970 B2* | 12/2012 | Seshadri et al. | 714/776 |
| 8,392,781 B2 | 3/2013 | Batra et al. | |
| 8,464,118 B2* | 6/2013 | Nikkila | H04L 12/6418 714/746 |
| 8,654,748 B2* | 2/2014 | Trainin | H04W 72/1278 370/338 |
| 8,732,559 B2* | 5/2014 | Liu et al. | 714/776 |
| 8,819,532 B2* | 8/2014 | Viger | H04L 1/0041 714/800 |
| 8,971,247 B2* | 3/2015 | Abraham et al. | 370/328 |
| 2005/0058151 A1* | 3/2005 | Yeh | H04W 52/46 370/445 |
| 2005/0220145 A1* | 10/2005 | Nishibayashi | H04W 99/00 370/474 |
| 2005/0249244 A1* | 11/2005 | McNamara et al. | 370/474 |
| 2006/0078001 A1* | 4/2006 | Chandra | H04L 12/46 370/473 |
| 2008/0144493 A1* | 6/2008 | Yeh | H04W 52/50 370/230 |
| 2009/0092152 A1* | 4/2009 | Rajakarunanayake et al. | 370/473 |
| 2012/0320932 A1 | 12/2012 | Xu et al. | |
| 2013/0155952 A1* | 6/2013 | Chu et al. | 370/328 |
| 2014/0079016 A1* | 3/2014 | Dai | H04L 5/0041 370/330 |

OTHER PUBLICATIONS

Becvar, Z., and Mach, P. (2012). On Efficiency of ARQ and HARQ Entities Interaction in WiMAX Networks, Advanced Transmission Techniques in WiMAX, Dr. Roberto Hincapie (Ed.), ISBN: 978-953-307-965-3, InTech, DOI: 10.5772/28981, pp. 147-164. Available from: http://www.intechopen.com/books/advanced-transmission-techniques-in-wimax/on-efficiency-of-arq-and-harq-entities-interaction-in-wimax-networks.

Cudak, M., et al., "Revision of LDPC to accommodate HARQ," IEEE 802.16 Broadband Wireless Access Working Group, Document IEEE C802.16e-04/95, May 11, 2004, 10 pp.

UK Essays, "Evaluation of HARQ mechanism in WiMax," ukessays.co.uk, Copyright 2003-2011, Retrieved from http://www.ukessays.co.uk/essays/engineering/evaluation-of-harq-mechanism-in-wimax.php, 22 pp.

* cited by examiner

METHOD, DEVICE, AND APPARATUS FOR ERROR DETECTION AND CORRECTION IN WIRELESS COMMUNICATIONS

CROSS-REFERENCE TO RELATED APPLICATIONS

This application claims priority to U.S. Provisional Patent Application No. 61/722,029, which is entitled "SYSTEMS AND METHODS FOR ERROR DETECTION AND CORRECTION IN WIRELESS COMMUNICATIONS" filed Nov. 2, 2012, assigned to the assignee hereof, and the entirety of which is incorporated herein by reference. This application also claims priority to U.S. Provisional Patent Application No. 61/844,806, which is entitled "SYSTEMS AND METHODS FOR ERROR DETECTION AND CORRECTION IN WIRELESS COMMUNICATIONS" filed Jul. 10, 2013, assigned to the assignee hereof, and the entirety of which is incorporated herein by reference.

TECHNICAL FIELD

The present application relates generally to wireless communication systems and more specifically to a method, device, and apparatus for error detection and correction in wireless communications.

BACKGROUND

In many telecommunication systems, communications networks are used to exchange messages among several interacting spatially-separated devices. Networks can be classified according to geographic scope, which may be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when network elements are mobile and thus have dynamic connectivity needs, or when the network architecture is formed in an ad hoc, rather than fixed, topology. A mobile network element such as a wireless station (STA) and an access point (AP) can exchange messages in noisy or lossy wireless conditions. Under certain conditions, received messages can contain errors. Accordingly, there is a need for error detection and correction in a wireless communication network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include error detection and correction in wireless communication systems for access points and devices.

One aspect of the subject matter described in the disclosure provides a method of communicating in a wireless system. The method includes transmitting a first packet from a sending device to a receiving device. The method further includes listening for an acknowledgement during a first time period. The method further includes transmitting a second packet to the receiving device after a second time period, when an acknowledgement is not received during the first time period. The second packet includes one or more error-correction codes operable to recover the first packet.

Another aspect of the subject matter described in the disclosure provides a method of communicating in a wireless system. The method includes receiving a first packet from a sending device at a receiving device. The method further includes storing at least a portion of the first packet if the first packet includes an error. The method further includes receiving a second packet at the end of a predetermined time period. The second packet includes one or more error-correction codes operable to recover the first packet. The method further includes matching the second packet to the first packet based on the time of receiving the second packet. The method further includes applying the error-correction codes to the first packet.

Another aspect of the subject matter described in the disclosure provides a method of communicating in a wireless system. The method includes receiving a first packet from a sending device at a receiving device. The method further includes storing at least a portion of the first packet if the first packet includes an error. The method further includes receiving a second packet including one or more error-correction codes operable to recover the first packet. The method further includes matching the second packet to the first packet based on one or more of a destination address and a sequence number of the first and second packets. The method further includes applying the error-correction codes to the first packet.

Another aspect of the subject matter described in the disclosure provides a device configured to communicate in a wireless system. The device includes a transmitter configured to transmit a first packet from to a receiving device. The device further includes a receiver configured to listen for an acknowledgement during a first time period. The device further includes wherein the transmitter is further configured to transmit a second packet to the receiving device after a second time period, when an acknowledgement is not received during the first time period. The second packet includes one or more error-correction codes operable to recover the first packet.

Another aspect of the subject matter described in the disclosure provides a device configured to communicate in a wireless system. The device includes a receiver configured to receive a first packet from a sending device. The device further includes a memory configured to store at least a portion of the first packet if the first packet includes an error. The device further includes wherein the receiver is further configured to receive a second packet at the end of a predetermined time period. The second packet includes one or more error-correction codes operable to recover the first packet. The device further includes wherein the device further includes one or more processors configured to match the second packet to the first packet based on the time of receiving the second packet. The processor is further configured to apply the error-correction codes to the first packet.

Another aspect of the subject matter described in the disclosure provides a device configured to communicate in a wireless system. The device includes a receiver configured to receive a first packet from a sending device. The device further includes a memory configured to store at least a portion of the first packet if the first packet includes an error. The receiver is further configured to receive a second packet including one or more error-correction codes operable to recover the first packet. The device further includes one or more processors configured to match the second packet to the first packet based on one or more of a destination address and a sequence number of the first and second packets. The processor is further configured to apply the error-correction codes to the first packet.

Another aspect of the subject matter described in the disclosure provides an apparatus for communicating in a wireless system. The apparatus includes means for transmitting a first packet from a sending device to a receiving device. The apparatus further includes means for listening for an acknowledgement during a first time period. The apparatus further includes means for transmitting a second packet to the receiving device after a second time period, when an acknowledgement is not received during the first time period. The second packet includes one or more error-correction codes operable to recover the first packet.

Another aspect of the subject matter described in the disclosure provides an apparatus for communicating in a wireless system. The apparatus includes means for receiving a first packet from a sending device at a receiving device. The apparatus further includes means for storing at least a portion of the first packet if the first packet includes an error. The apparatus further includes means for receiving a second packet at the end of a predetermined time period. The second packet includes one or more error-correction codes operable to recover the first packet. The apparatus further includes means for matching the second packet to the first packet based on the time of receiving the second packet. The apparatus further includes means for applying the error-correction codes to the first packet.

Another aspect of the subject matter described in the disclosure provides an apparatus for communicating in a wireless system. The apparatus includes means for receiving a first packet from a sending device at a receiving device. The apparatus further includes means for storing at least a portion of the first packet if the first packet includes an error. The apparatus further includes means for receiving a second packet including one or more error-correction codes operable to recover the first packet. The apparatus further includes means for matching the second packet to the first packet based on one or more of a destination address and a sequence number of the first and second packets. The apparatus further includes means for applying the error-correction codes to the first packet.

Another aspect of the subject matter described in the disclosure provides a non-transitory computer-readable medium including code that, when executed, causes an apparatus to transmit a first packet from a sending device to a receiving device. The medium further includes code that, when executed, causes the apparatus to listen for an acknowledgement during a first time period. The medium further includes code that, when executed, causes the apparatus to transmit a second packet to the receiving device after a second time period, when an acknowledgement is not received during the first time period. The second packet includes one or more error-correction codes operable to recover the first packet.

Another aspect of the subject matter described in the disclosure provides a non-transitory computer-readable medium including code that, when executed, causes an apparatus to receive a first packet from a sending device at a receiving device. The medium further includes code that, when executed, causes the apparatus to store at least a portion of the first packet if the first packet includes an error. The medium further includes code that, when executed, causes the apparatus to receive a second packet at the end of a predetermined time period, the second packet including one or more error-correction codes operable to recover the first packet. The medium further includes code that, when executed, causes the apparatus to match the second packet to the first packet based on the time of receiving the second packet. The medium further includes code that, when executed, causes the apparatus to apply the error-correction codes to the first packet.

Another aspect of the subject matter described in the disclosure provides a non-transitory computer-readable medium including code that, when executed, causes an apparatus to receive a first packet from a sending device at a receiving device. The medium further includes code that, when executed, causes the apparatus to store at least a portion of the first packet if the first packet includes an error. The medium further includes code that, when executed, causes the apparatus to receive a second packet including one or more error-correction codes operable to recover the first packet. The medium further includes code that, when executed, causes the apparatus to means for matching the second packet to the first packet based on one or more of a destination address and a sequence number of the first and second packets. The medium further includes code that, when executed, causes the apparatus to apply the error-correction codes to the first packet.

Another aspect of the subject matter includes an implementation in which a polled protocol can be implemented where NACK messages are sent in response to a separate polling frame that includes a unique identifier (e.g., the MAC address of the intended recipient, etc.). In one implementation, if a receiver station receives a packet from a transmitter station and the receiver station finds errors in MPDU decoding, the receiver station may save the packet and wait. If the transmitter station does not receive an ACK, it may send a polling frame that includes, for example, the MAC address of the intended recipient of the previous packet. If the polling frame is received without errors and the decoded MAC address matches the MAC address of the receiver station that stored the incorrectly decoded packet, the receiver station can send a NACK to the transmitter station in response to the polling frame, informing the transmitter station that the incorrectly decoded packet is stored and it is ready to receive a parity packet for combining with the stored packet. If the polling frame includes a different MAC address, the receiver station that stored the frame can discard it. Furthermore, if the stored packet is actually intended for a different receiver station that decoded the packet without errors, this receiver station will send an ACK back to the transmitter station, no polling frame will be sent, and the receiver station that stored the incorrectly decoded packet may discard the packet after a defined period in which no polling frame addressed to it is received.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and may not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention can be practiced without these specific details. In some instances, well-known structures and devices are shown in block diagram form in order to avoid obscuring the novelty of the exemplary embodiments presented herein.

Figure 1:
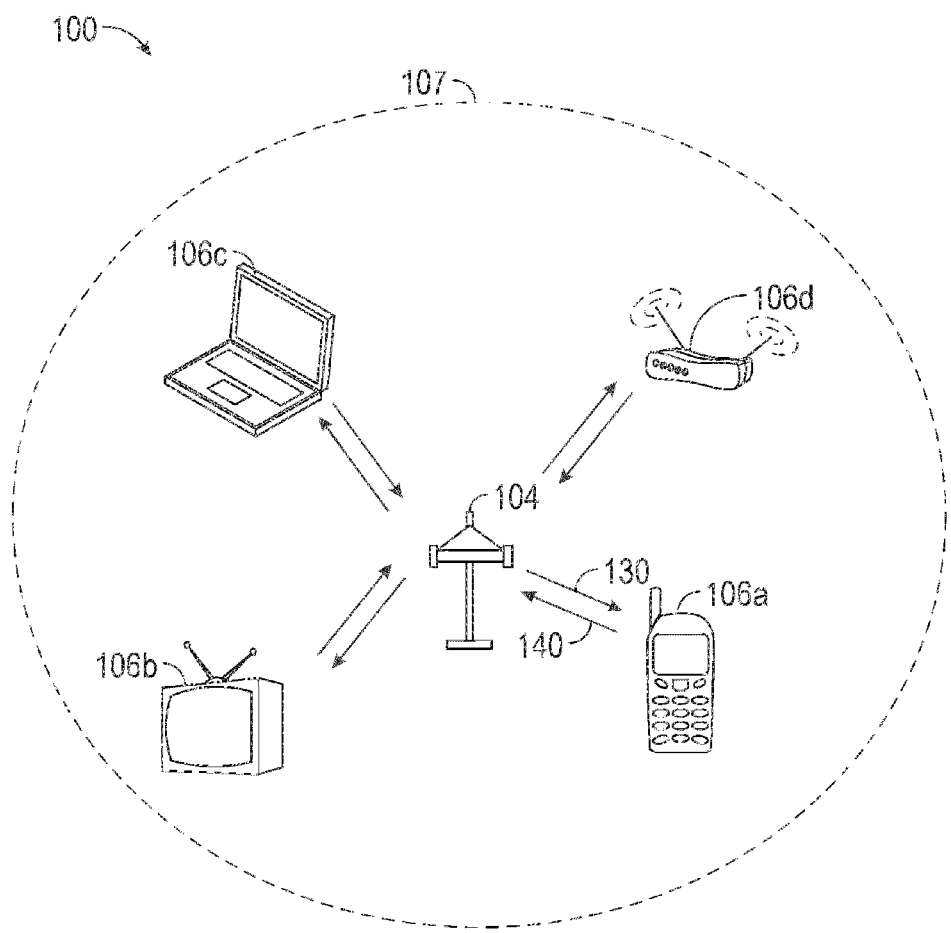
FIG. 1 shows an exemplary wireless communication system in which aspects of the present disclosure can be employed.

FIG. 1 shows an exemplary wireless communication system 100 in which aspects of the present disclosure can be employed. The wireless communication system 100 includes an access point (AP) 104, which communicates with a plurality of stations (STAs) 106*a*-106*d* in a basic service area (BSA) 107. In various embodiments described herein, the AP 104 and/or the STAs 106*a*-106*d* can be configured to detect and correct communication errors.

In some embodiments, the AP 104 and STAs can implement an automatic repeat request (ARQ) error-control procedure for data transmission. ARQ can use acknowledgements (ACKs) and timeouts to facilitate reliable data transmission. An ACK can include a message sent by a receiver indicating that it has correctly received a data frame or packet. A timeout can include a period of time allowed to elapse before a message is retransmitted. In other words, if a sender does not receive an ACK before the timeout, it can re-transmit the packet until the sender receives an ACK or exceeds a threshold number of re-transmissions. In some embodiments, the receiver discards packets that are not successfully decoded.

In some embodiments, the AP 104 and STAs can implement a hybrid ARQ (HARQ) error-control procedure for data transmission. HARQ can further implement error-correction codes to facilitate reliable data transmission. In various embodiments, as used herein, error-correction codes can encompass any error-correction codes including, but not limited to, parity information, forward error-correction (FEC) codes, fountain codes, raptor codes, etc.

In some embodiments, the sender can transmit additional packets including additional error-correction codes, when an ACK is not received. The receiver can store packets that are unsuccessfully decoded for later combination with additional packets including additional error-correction codes. Accordingly, the receiver can recover unsuccessfully decoded packets by matching the packets with the additional error-correction codes.

In various embodiments, the wireless communication system 100 can include a wireless local area network (WLAN). The WLAN can be used to interconnect nearby devices, employing one or more networking protocols. The various aspects described herein can apply to any communication standard, such as the Institute of Electrical and Electronic Engineers (IEEE) 802.11 wireless protocols. For example, the various aspects described herein can be used as part of the IEEE 802.11a, 802.11b, 802.11g, 802.11n, and/or 802.11ah protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access, machine-to-machine (M2M) communications, etc.

The AP 104 can serve as a hub or base station for the wireless communication system 100. For example, the AP 104 can provide wireless communication coverage in the BSA 107. The AP 104 can include, be implemented as, or known as a NodeB, Radio Network Controller (RNC), eNodeB, Base Station Controller (BSC), Base Transceiver Station (BTS), Base Station ("BS"), Transceiver Function (TF), Radio Router, Radio Transceiver, or some other terminology.

The STAs 106*a*-106*d* (collectively referred to herein as STAs 106) can include a variety of devices such as, for example, laptop computers, personal digital assistants (PDAs), mobile phones, etc. The STAs 106 can connect to, or associate with, the AP 104 via a WiFi (e.g., IEEE 802.11 protocol such as 802.11ah) compliant wireless link to obtain general connectivity to the Internet or to other wide area networks.

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104, along with the STAs 106a-106d associated with the AP 104, and that are configured to use the AP 104 for communication, can be referred to as a basic service set (BSS). In some embodiments, the wireless communication system 100 may not have a central AP 104. For example, in some embodiments, the wireless communication system 100 can function as a peer-to-peer network between the STAs 106. Accordingly, the functions of the AP 104 described herein can alternatively be performed by one or more of the STAs 106. Moreover the AP 104 can implement one or more aspects described with respect to the STAs 106, in some embodiments.

A communication link that facilitates transmission from the AP 104 to one or more of the STAs 106 can be referred to as a downlink (DL) 130, and a communication link that facilitates transmission from one or more of the STAs 106 to the AP 104 can be referred to as an uplink (UL) 140. Alternatively, a downlink 130 can be referred to as a forward link or a forward channel, and an uplink 140 can be referred to as a reverse link or a reverse channel.

A variety of processes and methods can be used for transmissions in the wireless communication system 100 between the AP 104 and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104 and the STAs 106 in accordance with OFDM/OFDMA processes. Accordingly, the wireless communication system 100 can be referred to as an OFDM/OFDMA system. As another example, signals can be sent and received between the AP 104 and the STAs 106 in accordance with CDMA processes. Accordingly, the wireless communication system 100 can be referred to as a CDMA system.

Aspects of certain devices (such as the AP 104 and the STAs 106) implementing such protocols can consume less power than devices implementing other wireless protocols. The devices can be used to transmit wireless signals across a relatively long range, for example about one kilometer or longer. As described in greater detail herein, in some embodiments, devices can be configured to establish wireless links faster than devices implementing other wireless protocols.

Timing Based Matching

Figure 2:
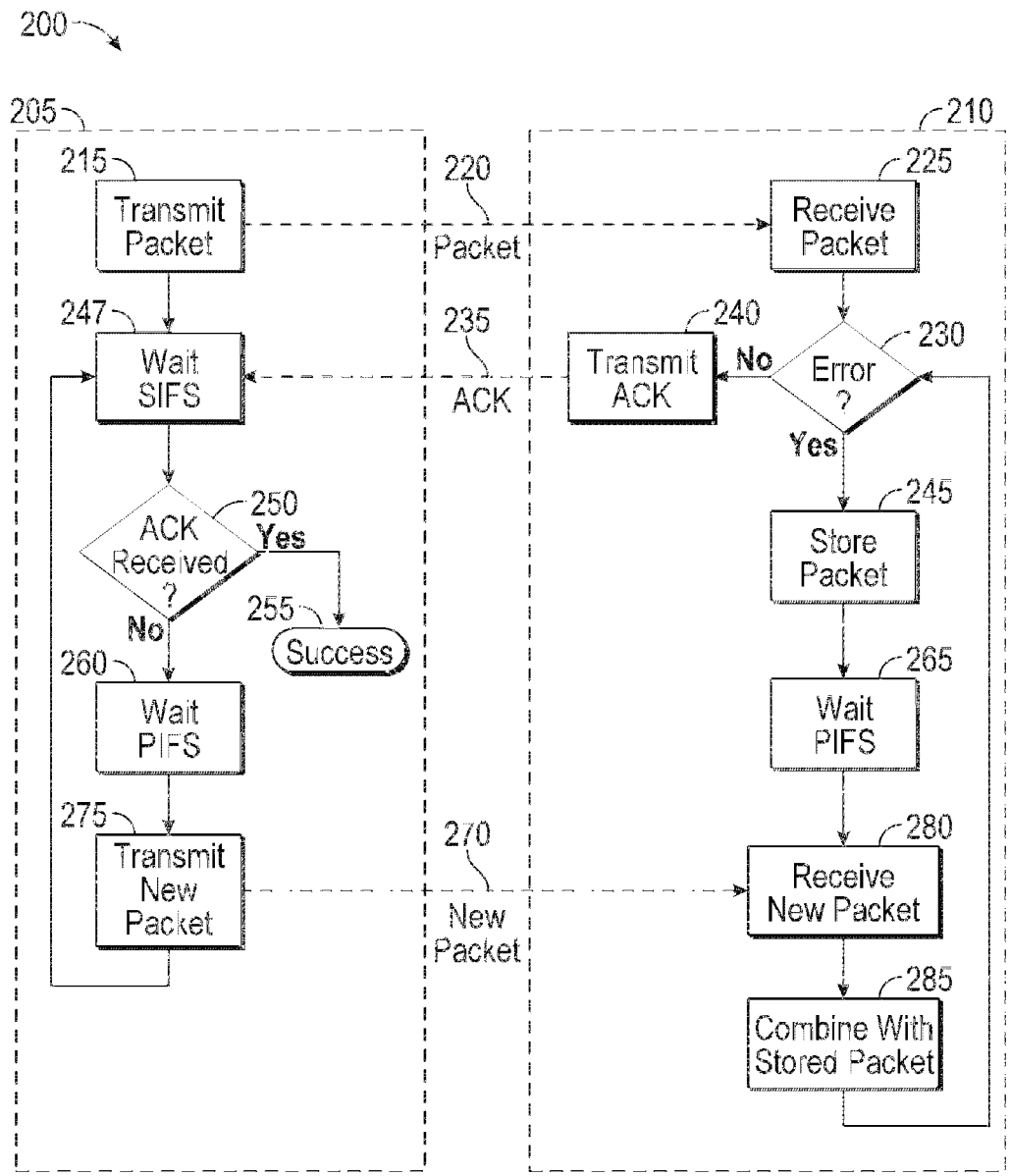
FIG. 2 shows an exemplary communication exchange in the wireless communication system of FIG. 1.

FIG. 2 shows an exemplary communication exchange 200 in the wireless communication system 100 of FIG. 1. Signaling is shown, according to various embodiments, between a sending station (TX STA) 205 and a receiving device (RX STA) 210. In various embodiments, the TX STA 205 shown in FIG. 2 can include any of the AP 104 and/or the STAs 106a-106d, described above with respect to FIG. 1. Likewise, the RX STA 210 shown in FIG. 2 can include any of the AP 104 and/or the STAs 106a-106d, described above with respect to FIG. 1.

As shown in FIG. 2, the TX STA 205 and the RX STA 210 can separately implement aspects of an error-control method. The illustrated method can facilitate reliable data transmission between the TX STA 205 and the RX STA 210 using timing information to match packets for error-correction. The method can be implemented in whole or in part by the devices described herein, such as the wireless device 702 shown in FIG. 7. Although the illustrated method is described herein with reference to a particular order, in various embodiments, blocks herein may be performed in a different order, or omitted, and additional blocks may be added.

First, at block 215, the TX STA 205 transmits a packet 220 to the RX STA 210. In various embodiments, the packet 220 can include one or more of a physical layer data unit (PPDU), a physical layer service data unit (PSDU), a media access control (MAC) protocol data unit (MPDU), and a MAC service data unit (MSDU). The packet 220 can include an error detection code, such as a frame check sequence (FCS) or a cyclic redundancy check (CRC). In some embodiments, the packet 220 can include one or more parity bits, and/or error-correction codes such as, for example, Reed-Solomon codes. In some embodiments the error correction can constitutes of a copy of the packet (repetition coding). In various embodiments, the error-correction codes can be applied to one or more of the PPDU, PSDU, MPDU, and MSDU.

The packet 220 can include an explicit indication that the packet is protected by error-correction codes. For example, the packet 220 can include the indication in one or more SIG fields, in a robust portion of a MAC header, etc. In some embodiments, error-correction can be implicit. For example, the RX STA 210 can assume that all packets at a given modulation and coding scheme (MCS), such as the lowest, are protected with error-correction codes, that all packets are eligible for error-correction, etc. In various embodiments, the RX STA 210 can exchange management information with the TX STA 205, which can indicate that all or certain packets are eligible for error correction.

Next, at block 225, the RX STA 210 receives the packet 220. The RX STA 210 can detect the packet based on a training sequence, such as a short training field (STF). In some embodiments, the packet 210 can include a signal (SIG) field. In some embodiments, the packet 220 can include an FCS field.

Then, at block 230, the RX STA 210 determines whether the packet 220 was successfully decoded. For example, when receiving the packet 220, the RX STA 210 may encounter an error at the SIG field of the packet 220. In some circumstances, the TX STA 205 may encounter an error when verifying the correctness of the received packet 220 based on the FCS field. If the RX STA 210 decodes the packet 220 without error, it can transmit an ACK 235 to the TX STA 205 at block 240. On the other hand, if the RX STA 210 encounters an error decoding the packet 220, it can store the packet 220 at block 245.

Meanwhile, at block 247, the TX STA 205 can wait for the ACK 235 from the RX STA 210. The TX STA 205 can be configured to wait for a first amount of time. For example, in the illustrated embodiment, the TX STA 205 waits for the duration of a short interframe space (SIFS). The RX STA 210 can be expected to transmit the ACK 235 at the end of the SIFS upon successful receipt of the packet 220.

Subsequently, at block 250, after the duration of the SIFS has ended, the TX STA 205 determines whether it has received the ACK 235. If the TX STA 205 has received the ACK 235, then the TX STA 205 can determine that the packet 220 was successfully received at block 255. On the other hand, if the TX STA 205 has not received the ACK 235, then the TX STA 205 can wait for a second amount of time at block 260. For example, in the illustrated embodiment, the TX STA 205 waits for the duration of a point coordination function (PCF) interframe space (PIFS). In an embodiment, the second amount of time can be larger than the first amount of time.

Meanwhile, at block 245, after encountering an error decoding the packet 220, the RX STA 210 stores the packet 220. In an embodiment, when the RX STA 210 encounters an error at a signal (SIG) field of the packet 220, or when comparing the received packet 220 to an FCS field, the RX STA 210 can store the entire PPDU of the packet 220 for later combination with additional error-correction codes. In some embodiments, the TX STA 205 can store the packet 220 without the STF. In another embodiment, when the RX STA 210 encounters an error when comparing the received packet 220 to an FCS field, the RX STA 210 can store the entire PSDU or the MPDU of the packet 220 for later combination with additional error-correction codes.

Thereafter, at block 265 the RX STA 210 can wait for the second amount of time. As discussed above, the RX STA 210 can wait for the duration of a PIFS. In various embodiments, the first and second amounts of time can be predetermined, preprogrammed, dynamically determined, coordinated, and/or communicated between the TX STA 205 and the RX STA 210.

After the duration of the PIFS, the TX STA 205 can transmit a new packet 270 at block 275, which the RX STA 210 can receive at block 280. The new packet 270 can be a retransmission of the data in the packet 220. The new packet 270 can include one or more parity bits, and/or error-correction codes such as, for example, forward error-correction (FEC) Reed-Solomon codes. In various embodiments, the error-correction codes can be applied to one or more of the PPDU, PSDU, MPDU, and MSDU. In various embodiments, the new packet 270 can include additional parity information and/or error-correction codes, which can be cumulative to the packet 220.

The new packet 270 can include an explicit indication that the packet is protected by error-correction codes. For example, the new packet 270 can include the indication in one or more SIG fields, in a robust portion of a MAC header, etc. In some embodiments, error-correction can be implicit. For example, the RX STA 210 can assume that all packets at a given modulation and coding scheme (MCS), such as the lowest, are protected with error-correction codes, that all packets are eligible for error-correction, etc. In various embodiments, the RX STA 210 can exchange management information with the TX STA 205 that may indicate that all or certain packets are eligible for error correction.

Next, at block 285, the RX STA 210 attempts to combine the new packet 270 with the stored packet 220, possibly in conjunction with one or more previously stored packets. The RX STA 210 can identify the new packet 270 as an error-correction packet for the packet 220 based on the timing by which it was received. For example, the RX STA 210 can match the new packet 270 to the packet 220 because it was received the second amount of time (e.g., one PIFS) after receiving the packet 220. Additional previously received packets can be matched in the same manner.

Then, at block 230, the RX STA 210 determines whether the packets 220 and 270 were successfully combined. Meanwhile, the TX STA 205 again waits for the duration of the SIFS at block 245. If the packets 220 and 270 were successfully combined, the RX STA 210 sends the ACK 235 at 240. If not, the process continues as described above. In some embodiments, the TX STA 205 can stop retransmission after reaching a maximum number of allowed retransmissions.

In some embodiments, the TX STA 205 may skip blocks 247 and 250 and may transmit the new packet 270 without waiting for the ACK 235. For example, the TX STA 205 can transmit the new packet 270 at the end of a SIFS time after transmitting the packet 220. In some embodiments, the TX STA 205 may not expect an ACK in response to certain types of packets 220. In some embodiments, the ACK 235 can be repeated twice.

Data Based Matching

Figure 3:
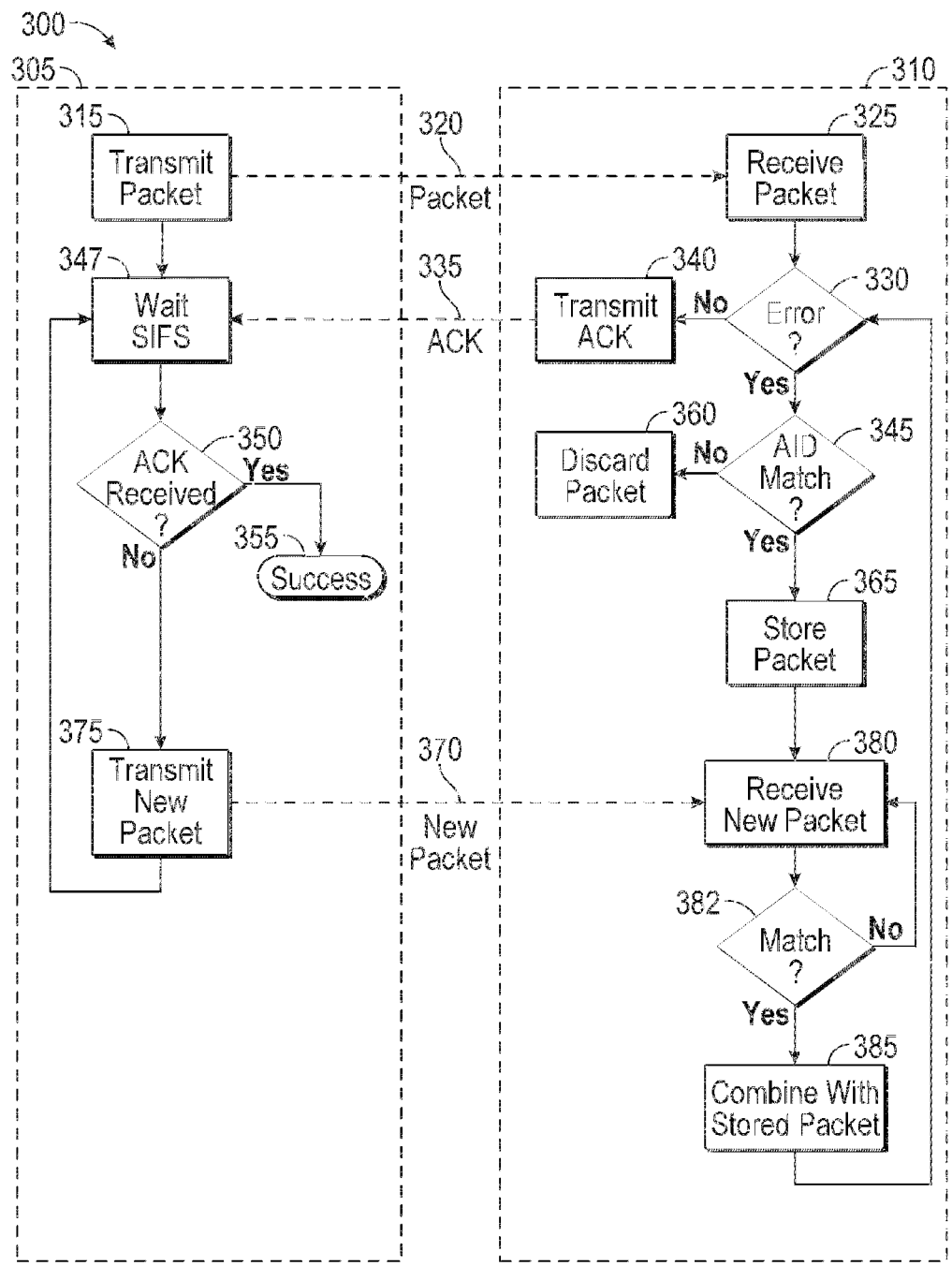
FIG. 3 shows another exemplary communication exchange in the wireless communication system of FIG. 1.

FIG. 3 shows another exemplary communication exchange 300 in the wireless communication system 100 of FIG. 1. Signaling is shown, according to various embodiments, between a TX STA 305 and an RX STA 310. In various embodiments, the TX STA 305 shown in FIG. 3 can include any of the AP 104 and/or the STAs 106a-106d, described above with respect to FIG. 1. Likewise, the RX STA 310 shown in FIG. 3 can include any of the AP 104 and/or the STAs 106a-106d, described above with respect to FIG. 1.

As shown in FIG. 3, the TX STA 305 and the RX STA 310 can separately implement aspects of an error-control method. The illustrated method can facilitate reliable data transmission between the TX STA 305 and the RX STA 310 using packet data to match packets for error-correction. The method can be implemented in whole or in part by the devices described herein, such as the wireless device 702 shown in FIG. 7. Although the illustrated method is described herein with reference to a particular order, in various embodiments, blocks herein may be performed in a different order, or omitted, and additional blocks may be added.

First, at block 315, the TX STA 305 transmits a packet 320 to the RX STA 310. In various embodiments, the packet 320 can include one or more of a PPDU, PSDU, MPDU, and MSDU. The packet 320 can include an error detection code, such as a frame check sequence (FCS) or a cyclic redundancy check (CRC). In some embodiments, the packet 320 can include one or more parity bits, and/or error-correction codes such as, for example, forward error-correction (FEC) Reed-Solomon codes. The parity bits can be referred to the coded PPSU, PSDU, or to each coded MPDU or MSDU.

The packet 320 can include an explicit indication that the packet is protected by error-correction codes. For example, the packet 320 can include the indication in one or more SIG fields, in a robust portion of a MAC header, etc. In some embodiments, error-correction can be implicit. For example, the RX STA 310 can assume that all packets at a given modulation and coding scheme (MCS), such as the lowest, are protected with error-correction codes, that all packets are eligible for error-correction, etc. In various embodiments, the RX STA 310 can exchange management information with the TX STA 305, which can indicate that all or certain packets are eligible for error correction.

The packet 320 can further include a robust destination indication. For example, the packet 320 can include a low-rate MAC header including a destination address. The low-rate MAC header can include an independent error detection and/or correction code. As another example, the packet 320 can include a physical layer (PHY) preamble including the destination address. In some embodiments, the retransmission of error-correction information may be applied to aggregated MPDUs (A-MPDUs) where at least one MPDU has been correctly decoded, so that the address was correctly received. In various embodiments, all MPDUs in an A-MPDU can have same destination address, so the RX STA 310 can obtain the address by decoding a single MPDU.

The packet 320 can further include a robust sequence indication. The packet 320 can further include an indication that it is a data packet, as opposed to an error-correction packet or other retransmission. For example, parity packets can be indicated in the PHY preamble or using a retry bit in the MAC header. In an embodiment the packet 320 can omit the parity indication.

Next, at block 325, the RX STA 310 receives the packet 320. The RX STA 310 can detect the packet based on a training sequence, such as a short training field (STF). In some embodiments, the packet 310 can include a signal (SIG) field. In some embodiments, the packet 320 can include an FCS field.

Then, at block 330, the RX STA 310 determines whether the packet 320 was successfully decoded. For example, when receiving the packet 320, the RX STA 310 may encounter an error at the SIG field of the packet 320. In some circumstances, the TX STA 310 may encounter an error when verifying the FCS field. If the RX STA 310 decodes the packet 320 without error, it can transmit an ACK 335 to the TX STA 305 at block 340. On the other hand, if the RX STA 310 encounters an error decoding the packet 320, it can check the destination of the packet 320 at block 345.

Meanwhile, at block 347, the TX STA 305 can wait for the ACK 335 from the RX STA 310. The TX STA 305 can be configured to wait for a first amount of time. For example, in the illustrated embodiment, the TX STA 305 waits for the duration of a short interframe space (SIFS). The RX STA 305 can be expected to transmit the ACK 335 at the end of the SIFS upon successful receipt of the packet 320. In some embodiments, the first amount of time can be the PIFS, or any other timing greater than the PIFS. Because the packet 320 includes robust addressing, the first amount of time can be dynamic, and need not be preset or prearranged.

Subsequently, at block 350, after the duration of the SIFS has ended the TX STA 305 determines whether it has received the ACK 335. If the TX STA 305 has received the ACK 335, then the TX STA 305 can determine that the packet 320 was successfully received at block 355. On the other hand, if the TX STA 305 has not received the ACK 335, then the TX STA 305 can transmit a new packet 370 at block 375.

Meanwhile, at block 345, after encountering an error decoding the packet 320, the RX STA 310 determines whether the packet 320 is addressed to the RX STA 310. In the illustrated embodiment, the STA 310 checks the destination of the packet 320 (such as the robust destination indication in the MAC header or PHY, as discussed above) against the association ID (AID) of the RX STA 310. In some embodiments, a partial AID at the PHY layer can be used. If the AID or partial AID does not match, the RX STA 310 can discard the packet 320 at block 360. On the other hand, if the AID or partial AID matches, the RX STA 310 can store the packet 320 at block 365.

Next, at block 365, the RX STA 310 stores the new packet 370. In an embodiment, when the RX STA 310 encountered an error at a signal (SIG) field of the new packet 370, or when comparing the received new packet 370 to an FCS field, the RX STA 310 can store the entire PPDU of the new packet 370 for later combination with additional error-correction codes. In some embodiments, the TX STA 310 can store the new packet 370 without the STF. In another embodiment, when the RX STA 310 encountered an error when comparing the received new packet 370 to an FCS field, the RX STA 310 can store the entire PSDU of the new packet 370 for later combination with additional error-correction codes.

Then, the RX STA 310 can receive the new packet 370 at block 380. In an embodiment, the RX STA 310 may not be able to predict when the TX STA 305 will transmit the new packet 370. The new packet 370 can be a retransmission of the data in the new packet 370. In various embodiments, the new packet 370 can include one or more of a PPDU, PSDU, MPDU, and MSDU. The new packet 370 can include an error detection code, such as a frame check sequence (FCS) or a cyclic redundancy check (CRC). In some embodiments, the new packet 370 can include one or more parity bits, and/or error-correction codes such as, for example, forward error-correction (FEC) Reed-Solomon codes. In various embodiments, the new packet 370 can include additional parity information and/or error-correction codes, which can be cumulative to the new packet 370. The parity bits can be referred to the coded PPSU, PSDU, or to each coded MPDU or MSDU.

The new packet 370 can include an explicit indication that the packet is protected by error-correction codes. For example, the new packet 370 can include the indication in one or more SIG fields, in a robust portion of a MAC header, etc. In some embodiments, error-correction can be implicit. For example, the RX STA 210 can assume that all packets at a given modulation and coding scheme (MCS), such as the lowest, are protected with error-correction codes, that all packets are eligible for error-correction, etc. In various embodiments, the RX STA 210 can exchange management information with the TX STA 205, which can indicate that all or certain packets are eligible for error correction.

The new packet 370 can further include a robust destination indication. For example, the new packet 370 can include a low-rate MAC header including a destination address. The low-rate MAC header can include an independent error detection and/or correction code. As another example, the new packet 370 can include a physical layer (PHY) preamble including the destination address. In some embodiments, the retransmission of error-correction information may be applied to aggregated MPDUs (A-MPDUs) where at least one MPDU has been acknowledged.

The new packet 370 can further include a robust sequence indication. The new packet 370 can further include an indication that it is an error-correction or retransmission packet, as opposed to a data packet. For example, error-correction packets can be indicated in the PHY preamble or using a retry bit in the MA header.

Thereafter, at block 382, the RX STA 310 determines whether the new packet 370 is addressed to the RX STA 310. In the illustrated embodiment, the STA 310 checks the destination of the new packet 370 (such as the robust destination indication in the MAC header or PHY, as discussed above) against the association ID (AID) of the RX STA 310. In some embodiments, a partial AID at the PHY layer can be used.

The RX STA 310 can also compare a sequence number of the packet 370 to determine if it matches the packet 220. For example, the new packet 370 can include a PSDU sequence number, sent in PHY or a robust MAC header as described above. If the AID, partial AID, or the sequence number does not match, the RX STA 310 can discard the new packet 370 and continue waiting for a new packet at block 380. On the other hand, if the AID or partial AID and sequence number matches, the RX STA 310 can combine the new packet 370 with the stored packet 320 at block 385. In various embodiments, the same mechanism can apply to PSDUs, MPDUs, and/or MSDUs, which may have an address and/or a sequence number.

Subsequently, at block 385, the RX STA 310 attempts to combine the new packet 370 with the stored packet 320, possibly in conjunction with one or more previously stored packets. The RX STA 310 can identify the new packet 370 as an error-correction packet for the packet 320 based on the data in the packet. For example, the RX STA 310 can match the new packet 370 to the packet 320 because it was addressed to the same AID and contained the same (or a related) sequence number. Additional previously received packets can be matched in the same manner.

Then, at block 330, the RX STA 310 determines whether the packets 320 and 370 were successfully combined. Meanwhile, the TX STA 310 again waits for the duration of the SIFS at block 345. If the packets 320 and 370 were successfully combined, the RX STA 310 sends an ACK at 340. If not, the process continues as described above. In some embodiments, the TX STA 310 can stop retransmission after reaching a maximum number of allowed retransmissions.

MPDU Retransmission as Parity

As discussed above with respect to FIGS. 2-3, in various embodiments, the packets 230, 270, 320, and/or 370 can include MPDUs, which can be transmitted as A-MPDUs. For example, the communication of MPDUs can involve substantial protocol processing overhead due to the RX STA 210 and/or 310 transmitting an ACK for each MPDU received. To reduce the overhead of handling many ACK transmissions, a number of MPDUs can be transmitted in back-to-back fashion as a single A-MPDU. Rather than the RX STA 210 and/or 310 acknowledging each MPDU separately, the receiver of the A-MPDU can transmit a single block ACK (BA) per A-MPDU.

Figure 4:
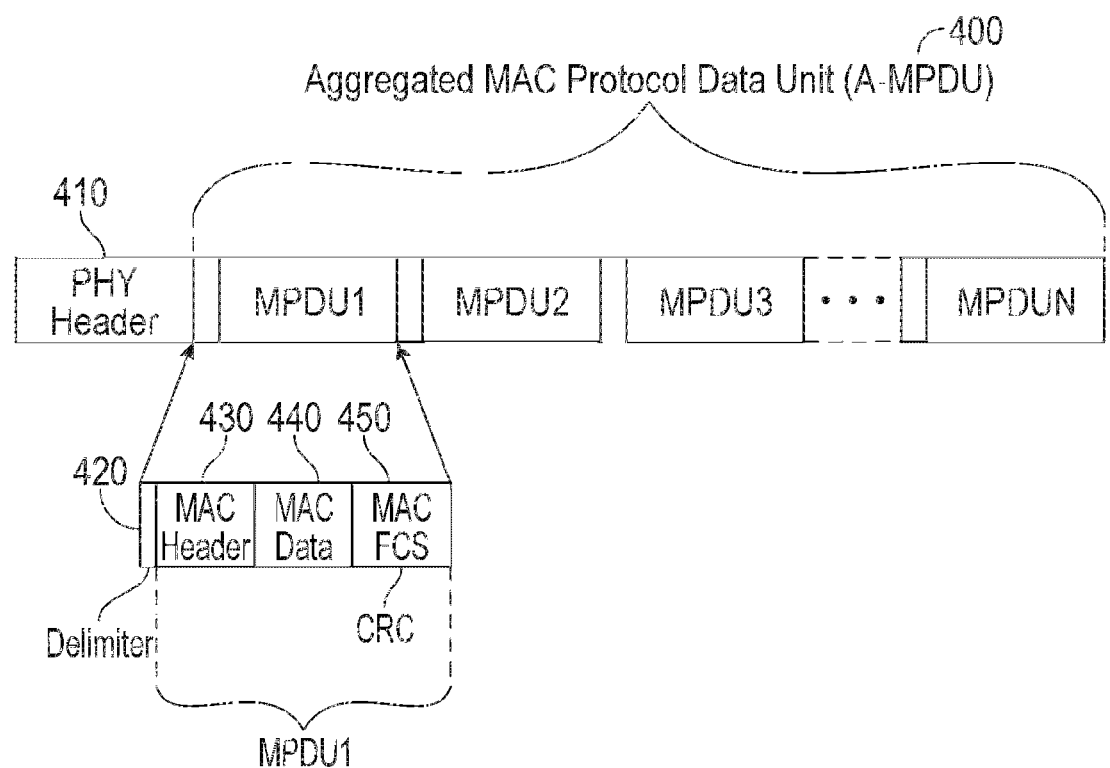
FIG. 4 is a diagram of an example of a data unit that can be used in the wireless communication system of FIG. 1.

FIG. 4 is a diagram of an example of a data unit 400 that can be used in the wireless communication system 100 of FIG. 1. In various embodiments, the A-MPDU 400 can include one or more of the packets 220, 270, 320, and 370 described above with respect to FIGS. 2-3. After the physical layer header 410, several MPDUs follow. MPDU1 is the first MPDU, MPDU2 is the second MPDU, and so forth. Each MPDU is preceded by a delimiter. The MPDU itself, as indicated by the exploded view of MPDU1, is preceded by a delimiter 420, and includes a MAC header 430, the MAC data or payload 440, and a MAC FCS (Frame Check Sequence) 450. The MAC FCS can be a 32-bit Cyclic Redundancy Check (CRC) code. Padding bits (not shown) can be added after the MAC FCS such that each MPDU is a multiple of four bytes in length.

Referring back to FIGS. 2-3, when a transmission fails, the TX STA 205 and/or 305 can retransmit the failed MPDU. In embodiments where MPDUs are transmitted in A-MPDUs, the TX STA 205 and/or 305 can include duplicated MPDUs in the same A-MPDU. Accordingly, for the RX STA 210 and/or 310 to store the received MPDUs (e.g., at blocks 245 and/or 365), the MPDU can be delimited with robust delimiters, using techniques similar to the robust addressing and robust sequencing described above. In an embodiment, aggregated PPDUs (A-PPDUs) can be used. In various embodiments, A-PPDUs can include one or more of an STF, a long training field (LTF), a SIG field, and a plurality of PSDUs. In some embodiments, each PSDU can include a separate STF and/or LTF.

Similarly, the MPDUs can include robust addressing, as described above. In an embodiment, the TX STA 205 and/or 305 can target A-MPDUs where at least one MPDU was acknowledged. Moreover, the MPDUs can include robust sequencing, as described above. In an embodiment, the TX STA 205 and/or 305 can include preventative retransmissions in the same A-MPDU.

HARQ with Raptor Codes

As discussed above with respect to FIGS. 2-3, in various embodiments, the packets 230, 270, 320, and/or 370 can include MPDUs, which can be transmitted as A-MPDUs. In some embodiments, the MPDUs can be encoded using fountain codes such as, for example, raptor codes. Raptor codes are described in U.S. Pat. No. 7,068,729, entitled "Multi-Stage Code Generator And Decoder For Communication Systems", by Amin Shokrollahi, et al., Jun. 27, 2006 (the entire content of which is incorporated by reference herein).

Figure 5:
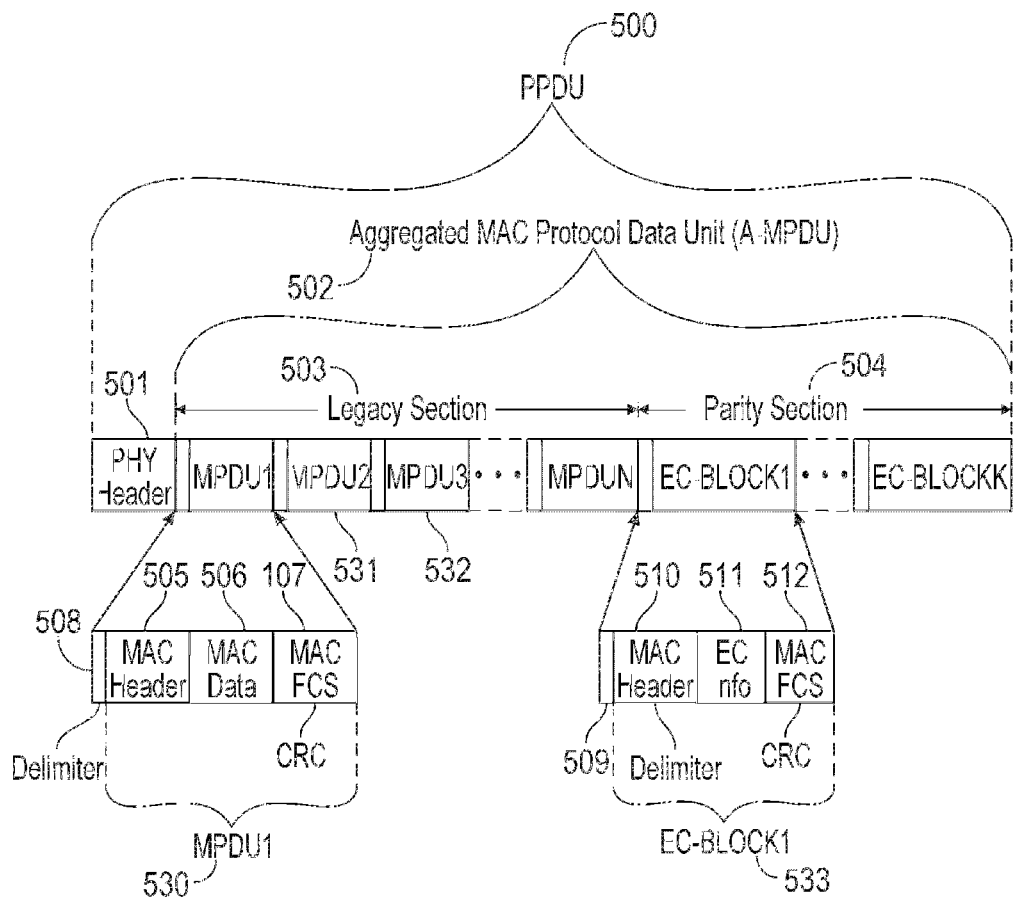
FIG. 5 is a diagram of a data unit that includes error-correction coding information that can be used in the wireless communication system of FIG. 1.

FIG. 5 is a diagram of a data unit 500 that includes error-correction coding information that can be used in the wireless communication system 100 of FIG. 1. In various embodiments, the PPDU 500 can include one or more of the packets 220, 270, 320, and 370 described above with respect to FIGS. 2-3. As illustrated, the PPDU 500 includes an A-MPDU 502. The PPDU 500 includes a PHY header 501 and the physical layer payload 502. The payload 502 in this case is the A-MPDU 502. The A-MPDU 502 includes a legacy section 503 and a section referred to here as a parity section 504. The parity section 504 can also be referred to as an error-correction section. The legacy section 503 includes a set of MPDUs, each preceded by its own delimiter as illustrated. MPDU1 530 is the first MPDU; MPDU2 531 is the second MPDU; MPDU 532 is the third MPDU, and so forth. Each delimiter includes a predetermined combination of bits as a signature that can be used by the receiver to determine the beginning of each MPDU within the A-MPDU 502. The payloads of the MPDUs carry the data payload of the MAC layer communication. Each MPDU, as indicated by the exploded view of the MPDU1 530, includes a MAC header 505, the MAC data or payload 506, and a MAC FCS 507. Each MPDU is preceded by its own delimiter, as illustrated. The delimiter 508 is the delimiter that precedes MPDU1. The MAC FCS can include a 32-bit CRC code. Padding bits (not shown) can be added after the MAC FCS such that each MPDU is a multiple of four bytes in length. In an embodiment, the legacy portion 503 of the A-MPDU 502 can adhere to a standard and conventional form. The parity section 504 can include one or more error-correction blocks (EC-Blocks). In one example, the EC-Blocks are MPDUs that include MAC headers, MAC data or payloads, and MAC FCS portions. In another example, the EC-B locks have no headers.

In the example of FIG. 5, the EC-Blocks of the parity section 504 are MPDUs. As indicated in the exploded view of EC-Block1 533, each EC-Block is preceded by a delimiter, and includes a MAC header, MAC data or payload, and MAC FCS. The delimiter 509 is the delimiter for EC-Block1 533. The EC-Block1 533 includes the MAC header 510, the MAC data or payload 511, and the MAC FCS 512. The MAC data or payload, in the case of an EC-Block, includes error-correction coding information (EC INFO) usable to correct MPDUs of the legacy section if one or more MPDUs of the legacy section may become corrupted or lost.

Although, in the example shown in FIG. 5, the EC-Blocks are transmitted at the end of the A-MPDU 502, EC-Blocks may also be transmitted at the beginning of the A-MPDU 502, or between two MPDUs that contain data in the legacy section.

A property of fountain codes is that the information contained in N MPDUs can be derived from any of N encoded MPDUs out of N+K encoded MPDUs, so in principle the receiver need not be able to distinguish between data and EC blocks. The receiver can know the number N of information MPDUs to look for. This number N may be indicated in the SIG field in a PHY preamble, in the MPDU delimiter, or in the MAC header of each MDU, or can be a number agreed between transmitter and receiver, and hence not explicitly indicated in the packet.

Alternatively, in order to enable the receiver to determine which MPDUs or Blocks are EC-Blocks, certain information can be inserted in the header or delimiter of the MPDUs that carry EC-Blocks. In particular, each header or delimiter may contain at least one of a "Type" and "Sub-type" fields, each including one or more bits. For any MPDU, the combination of these bits determines the type of information contained in the MPDU. For EC-Blocks, a new combination of Type and Subtype bits is defined to indicate that the associated MPDU includes an EC-Block. Furthermore, using the Duration field of the header, the transmitter can communicate the length of the EC-Block. In another embodiment, the EC-Block can be identified by a well defined reserved sequence number, or well defined reserved address.

In the Sequence Control field of the header, the transmitter can communicate an index or sequence number of the EC-Block, to enable the receiver to distinguish between different EC-Blocks. The sequence number of the EC block may be different than the one in the data packet. Some of the fields in the MAC header of an MPDU containing an EC-Block, such as Address fields, may not be applicable for the EC-Blocks, so these fields may be omitted from the MAC header to save channel time. In the alternative method described here, a receiver first determines that the MPDU includes an EC-Block, and then interprets the rest of the MAC header fields according to the definition for EC-Blocks, rather than according to the definition for ordinary data MPDUs. Another method for identifying EC-Blocks is to use the existing bit fields or signature fields in the delimiter preceding the EC-Block to mark the following EC-Block. For example, instead of the signature that is contained in the delimiters preceding data MPDUs, the transmitter can insert a different signature into the delimiters preceding EC-Blocks so that the different signature identifies the following MPDU as an EC-Block.

Signaling for Setup

Referring still to FIGS. 2-3, in some embodiments, the RX STA 210 and/or 310 can be configured to advertise HARQ capability to a TX STA 205 and/or 305. When the TX STA 205 and/or 305 receives an HARQ advertisement, it can adjust one or more behaviors such as: setting a retry limit to at least two, sending a retransmission after a PIFS, and/or including parity MPDUs in an A-MPDU. The TX STA 205 and/or 305 can be configured to transmit a confirmation of the HARQ mode to the RX STA 210 and/or 310. In various embodiments, retransmissions can be handled in the same manner as normal packets. For example, parity packets may not advance a MPDU sequence number.

Figure 6:
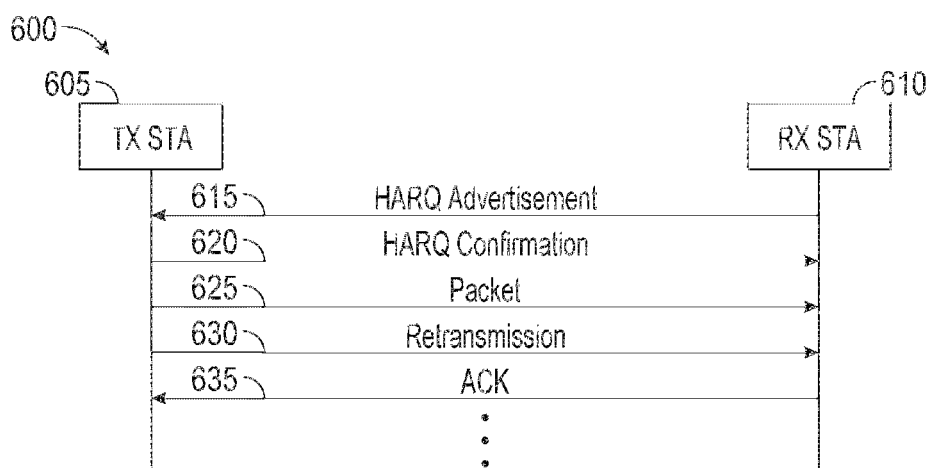
FIG. 6 shows an exemplary communication exchange in the wireless communication system of FIG. 1.

FIG. 6 shows an exemplary communication exchange 600 in the wireless communication system 100 of FIG. 1. Signaling is shown, according to various embodiments, between a TX STA 605 and an RX STA 610. In various embodiments, the TX STA 605 shown in FIG. 6 can include any of the AP 104, the STAs 106a-106d, and/or the TX STAs 205 (FIG. 2) and 305 (FIG. 3). Likewise, the RX STA 610 shown in FIG. 6 can include any of the AP 104, the STAs 106a-106d, and/or the RX STAs 210 (FIG. 2) and 310 (FIG. 3).

As shown, the RX STA 610 transmits an HARQ advertisement to the TX STA 605. The HARQ advertisement can indicate that the RX STA 610 is capable of combining error-correction packets as described herein. The TX STA 605 can transmit a HARQ confirmation 620 to the RX STA 610. Subsequently, the TX STA 605 can transmit a packet 625 to the TX STA 610, retransmit an error-correction packet 630, receive an ACK 635, etc., in accordance with one or more embodiments described herein.

Figure 7:
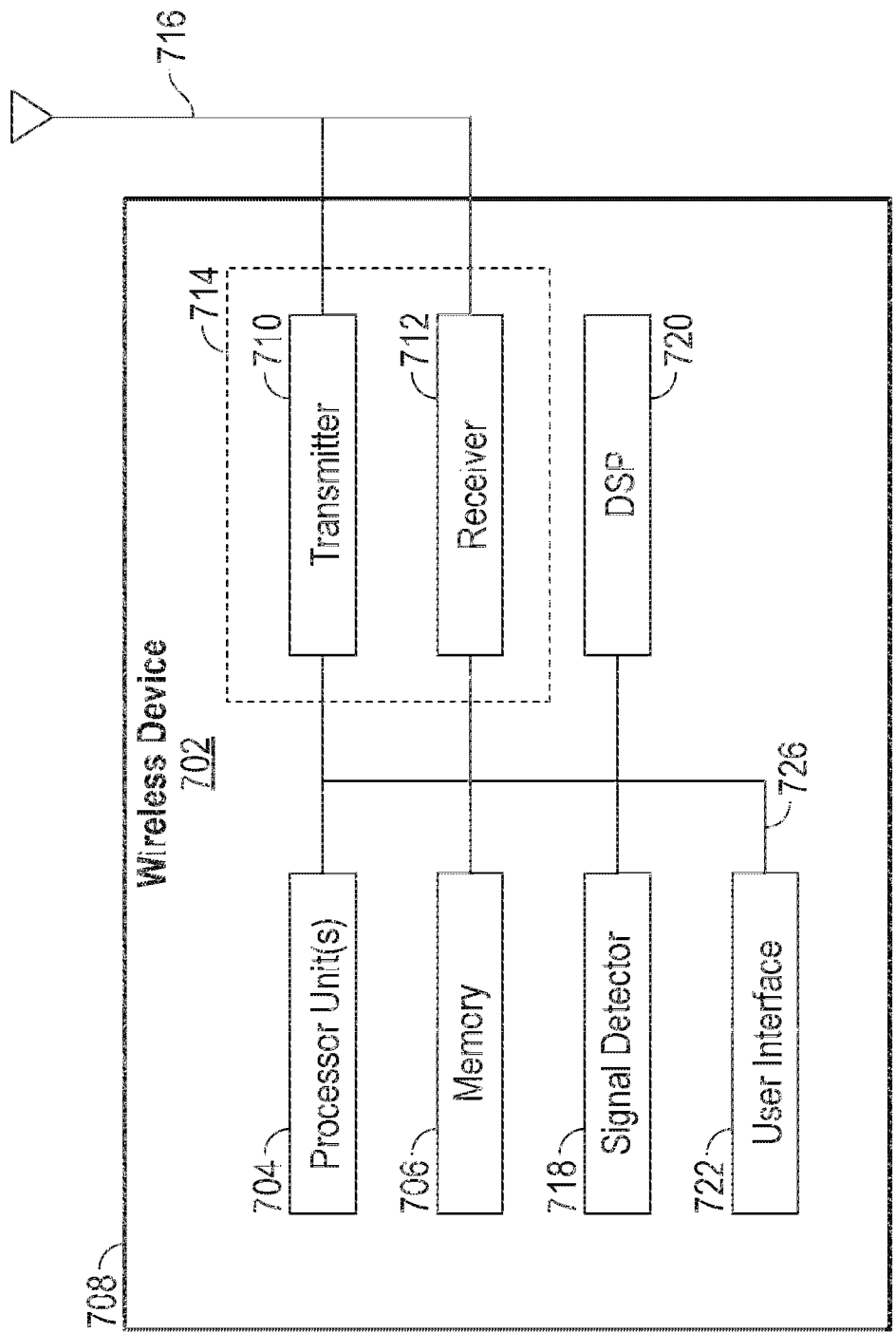
FIG. 7 shows a functional block diagram of an exemplary a wireless device that can be employed within the wireless communication system of FIG. 1.

FIG. 7 shows a functional block diagram of an exemplary wireless device 702 that can be employed within the wireless communication system 100 of FIG. 1. The wireless device 702 is an example of a device that can be configured to implement the various methods described herein. For example, the wireless device 702 can include the AP, one or more of the STAs 106, the TX STA 205 (FIG. 2) or 305 (FIG. 3), and/or the RX STA 210 (FIG. 2) or 310 (FIG. 3).

The wireless device 702 can include one or more processor units 704 which are configured to control operation of the wireless device 702. One or more of the processor units 704 can be collectively referred to as a central processing unit (CPU). A memory 706, which can include both read-only memory (ROM) and random access memory (RAM), provides instructions and data to the processor units 704. A portion of the memory 706 can also include non-volatile random access memory (NVRAM). The processor units 704 can be configured to perform logical and arithmetic operations based on program instructions stored within the memory 706. The processor 704 can be configured to implement one or more methods described herein, for example in conjunction with executable instructions in the memory 706.

When the wireless device 702 is implemented or used as an AP, the processor 704 can be configured to generate and transmit packets having error detection and/or correction codes. When the wireless device 702 is implemented or used as a STA, the processor units 704 can be configured to receive and decode packets having error detection and/or correction codes. Various processes to detect and correct communication errors are described in further detail herein.

The processor units 704 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor units 704 include a DSP, the DSP can be configured to generate a packet (e.g., a data packet) for transmission. In some aspects, the packet can include a physical layer data unit (PPDU).

The wireless device 702 can also include machine-readable media for storing software. The processing units 704 can include one or more machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor units 704, cause the wireless device 702 to perform the various functions described herein.

The wireless device 702 can include a transmitter 710 and/or a receiver 712 to allow transmission and reception, respectively, of data between the wireless device 702 and a remote location. The transmitter 710 and receiver 712 can be combined into a transceiver 714. An antenna 716 can be attached to the housing 708 and electrically coupled with the transceiver 714. The wireless device 702 can also include (not shown) multiple transmitters, multiple receivers, multiple transceivers, and/or multiple antennas.

The transmitter 710 can be configured to wirelessly transmit packets and/or signals. For example, the transmitter 710 can be configured to transmit different types of packets generated by the processor units 704, discussed above. The packets are made available to the transmitter 701. For example, the processor units 704 can store a packet in the memory 706 and the transmitter 701 can be configured to retrieve the packet. Once the transmitter retrieves the packet, the transmitter 701 transmits the packet to a STA 106 wireless device 702 via the antenna 716.

An antenna 716 on the STA 106 wireless device 702 detects wirelessly transmitted packets/signals. The STA 106 receiver 712 can be configured to process the detected packets/signals and make them available to the processor units 704. For example, the STA 106 receiver 712 can store the packet in memory 706 and the processor units 704 can be configured to retrieve the packet.

The wireless device 702 can also include a signal detector 718 that can be used in an effort to detect and quantify the level of signals received by the transceiver 714. The signal detector 718 can detect such signals as total energy, energy per subcarrier per symbol, power spectral density, and other signals. The wireless device 702 can also include a digital signal processor (DSP) 720 for use in processing signals. The DSP 720 can be configured to generate a packet for transmission. In some aspects, the packet can include a physical layer data unit (PPDU).

The wireless device 702 can further include a user interface 722 in some aspects. The user interface 722 can include a keypad, a microphone, a speaker, and/or a display. The user interface 722 can include any element or component that conveys information to a user of the wireless device 702 and/or receives input from the user. The wireless device 702 can also include a housing 708 surrounding one or more of the components included in the wireless device 702.

The various components of the wireless device 702 can be coupled together by a bus system 726. The bus system 726 can include a data bus, for example, as well as a power bus, a control signal bus, and a status signal bus in addition to the data bus. Those of skill in the art will appreciate the components of the wireless device 702 can be coupled together or accept or provide inputs to each other using some other mechanism.

Although a number of separate components are illustrated in FIG. 7, those of skill in the art will recognize that one or more of the components can be combined or commonly implemented. For example, the processor units 704 can be used to implement not only the functionality described above with respect to the processor units 704, but also to implement the functionality described above with respect to the signal detector 718. Further, each of the components illustrated in FIG. 7 can be implemented using a plurality of separate elements.

Figure 8:
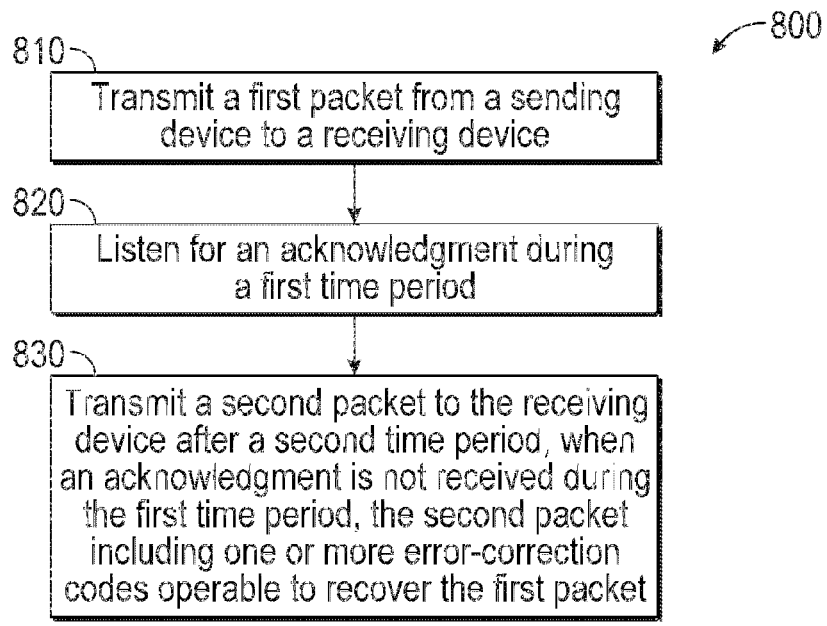
FIG. 8 shows a flowchart for an exemplary method of wireless communication that can be employed within the wireless communication system of FIG. 1.

FIG. 8 shows a flowchart for an exemplary method 800 of wireless communication that can be employed within the wireless communication system 100 of FIG. 1. The method 800 can be implemented in whole or in part by the devices described herein, such as the wireless device 702 shown in FIG. 7. Although the illustrated method 800 is described herein with reference to the wireless communication system 100 discussed above with respect to FIG. 1, the communication exchanges 200 and 300 discussed above with respect to FIGS. 2-3, and the wireless device 702 discussed above with respect to FIG. 7, a person having ordinary skill in the art will appreciate that the illustrated method 800 can be implemented by another device described herein, or any other suitable device. Although the illustrated method 800 is described herein with reference to a particular order, in various embodiments, blocks herein may be performed in a different order, or omitted, and additional blocks may be added.

First, at block 810, a sending device transmits a first packet to a receiving device. For example, the TX STA 205 and/or 305 can transmit the packet 220 and/or 320 to the RX STA 210 and/or 310. In an embodiment, the first packet can include one or more error-correction codes. In an embodiment, the first packet can include a portion of an A-MPDU encoded with raptor codes such as, for example, the A-MPDU 502 (FIG. 5).

Next, at block 820, the sending device listens for an acknowledgement during a first time period. For example, the TX STA 205 and/or 305 can wait for the ACK 235 during the SIFS. If the TX STA 205 and/or 305 receives the ACK 235, the TX STA 205 and/or 305 may not send addition error correction information.

Then, at block 830, when an acknowledgement is not received during the first time period, the sending device can transmit a second packet to the receiving device. The second packet can include one or more error-correction codes operable to recover the first packet. For example, the TX STA 205 and/or 305 can transmit the new packet 270 and/or 370 to the RX STA 210 and/or 310 after the PIFS.

In an embodiment, the second time period can include the PIFS. The error-correction codes can include parity information. The error-correction codes can include forward error correction codes. The second packet can include a portion of the same A-MPDU as the first packet. The A-MPDU can be encoded with raptor codes. The second packet can include an indication that it is an error-correction packet.

In an embodiment, the sending device can receive an advertisement that the receiving device supports error correction. For example, as described above with respect to FIG. 6, the TX STA 605 can receive the HARQ advertisement 615 from the RX STA 610. Moreover, the sending device can transmit a confirmation of an error correction mode to the receiving device. For example, the TX STA 605 can transmit the HARQ confirmation 620 to the RX STA 610.

In an embodiment, the method shown in FIG. 8 can be implemented in an apparatus for wireless communication that can include means for transmitting and means for listening. Those skilled in the art will appreciate that an apparatus for wireless communication may have more components than the simplified apparatus described herein. The wireless device described herein includes those components useful for describing some prominent features of implementations within the scope of the claims.

The means for transmitting can be configured to transmit the first packet from the sending device to the receiving device. The means for transmitting can include one or more of the antenna 716 (FIG. 7), a signal generator, a power source, an amplifier, the transmitter 710 (FIG. 7), the processor 704 (FIG. 7), and the memory 706 (FIG. 7). The means for transmitting can be further configured to transmit the second packet to the receiving device after the second time period, when an acknowledgement is not received during the first time period.

The means for listening can be configured to listen for an acknowledgement during a first time period. The means for listening can include one or more of the receiver 712 (FIG. 7), the antenna 716 (FIG. 7), the processor 704 (FIG. 7), and the memory 706 (FIG. 7).

Figure 9:
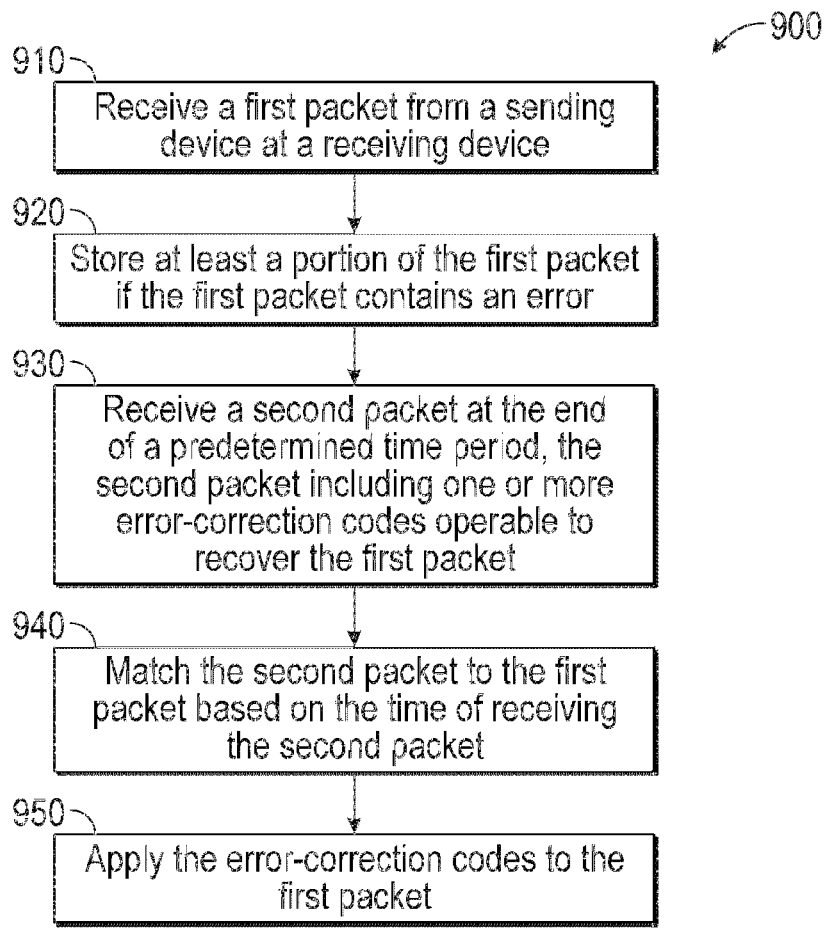
FIG. 9 shows a flowchart for an exemplary method of wireless communication that can be employed within the wireless communication system of FIG. 1.

FIG. 9 shows a flowchart for an exemplary method 900 of wireless communication that can be employed within the wireless communication system 100 of FIG. 1. The method 900 can be implemented in whole or in part by the devices described herein, such as the wireless device 702 shown in FIG. 7. Although the illustrated method 900 is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method 900 can be implemented by another device described herein, or any other suitable device. Although the illustrated method 900 is described herein with reference to a particular order, in various embodiments, blocks herein may be performed in a different order, or omitted, and additional blocks may be added.

First, at block 910, a receiving device receives a first packet from a sending device. For example, the RX STA 210 can receive the packet 220 from the TX STA 205. In an embodiment, the first packet can include one or more error-correction codes. In an embodiment, the first packet can include a portion of an A-MPDU encoded with raptor codes such as, for example, the A-MPDU 502 (FIG. 5).

Next, at block 920, receiving device stores at least a portion of the first packet if the first packet includes an error. For example, the RX STA 210 can store a portion of the packet 220 if it is not properly decoded. In an embodiment, when the RX STA 210 encounters an error at a signal (SIG) field of the packet 220, or when comparing the received packet 220 to an FCS field, the RX STA 210 can store the entire PPDU of the packet 220 for later combination with additional error-correction codes. In some embodiments, the TX STA 205 can store the packet 220 without the STF. In another embodiment, when the RX STA 210 encounters an error when comparing the received packet 220 to an FCS field, the RX STA 210 can store the entire PSDU of the packet 220 for later combination with additional error-correction codes.

Then, at block 930, the receiving device receives a second packet at the end of a predetermined time period. The second packet can include one or more error-correction codes operable to recover the first packet. For example, the RX STA 210 can receive the new packet 270 after the PIFS.

In an embodiment, the second time period can include the PIFS. The error-correction codes can include parity information. The error-correction codes can include forward error correction codes. The second packet can include a portion of the same A-MPDU as the first packet. The A-MPDU can be encoded with raptor codes. The second packet can include an indication that it is an error-correction packet.

Thereafter, at block 940, the receiving device matches the second packet to the first packet based on the time of receiving the second packet. For example, the RX STA 610 can match the new packet 270 to the packet 220 because it was received one SIFS after the packet 220 was received. In other words, the receiving device can assume that the second packet includes error-correction information for the first packet due to the predetermined timing.

Subsequently, at block 950, the receiving device applies the error-correction codes from the second packet to the first packet. For example, the RX STA 210 can apply the error-correction codes from the new packet 270 to the stored packet 220. In an embodiment, applying the error-correction codes can include forward error correction combination.

In an embodiment, the receiving device can transmit an advertisement that it supports error correction. For example, as described above with respect to FIG. 6, the RX STA 610 can transmit the HARQ advertisement 615 to the TX STA 605. Moreover, the receiving device can receive a confirmation of an error correction mode from the sending device. For example, the RX STA 610 can receive the HARQ confirmation 620 from the TX STA 605.

In an embodiment, the method shown in FIG. 9 can be implemented in an apparatus for wireless communication that can include means for receiving, means for storing, means for matching, and means for applying. Those skilled in the art will appreciate that an apparatus for wireless communication may have more components than the simplified apparatus described herein. The wireless device described herein includes those components useful for describing some prominent features of implementations within the scope of the claims.

The means for receiving can be configured to receive the first packet from the sending device. The means for receiving can include one or more of the receiver 712 (FIG. 7), the antenna 716 (FIG. 7), the processor 704 (FIG. 7), and the memory 706 (FIG. 7). The means for receiving can be further configured to receive the second packet at the end of the predetermined time period.

The means for storing can be configured to store at least a portion of the first packet when the first packet includes an error. The means for storing can include, for example, one or more of the memory 706 (FIG. 7) and the processor 704 (FIG. 7).

The means for matching can be configured to match the second packet to the first packet based on a timing of receiving the second packet. The means for matching can include, for example, one or more of the memory 706 (FIG. 7) and the processor 704 (FIG. 7).

The means for applying can be configured to apply the error-correction codes to the first packet. The means for applying can include any processor or controller such as, for example, the processor 704 (FIG. 7) in conjunction with the memory 706 (FIG. 7).

Figure 10:
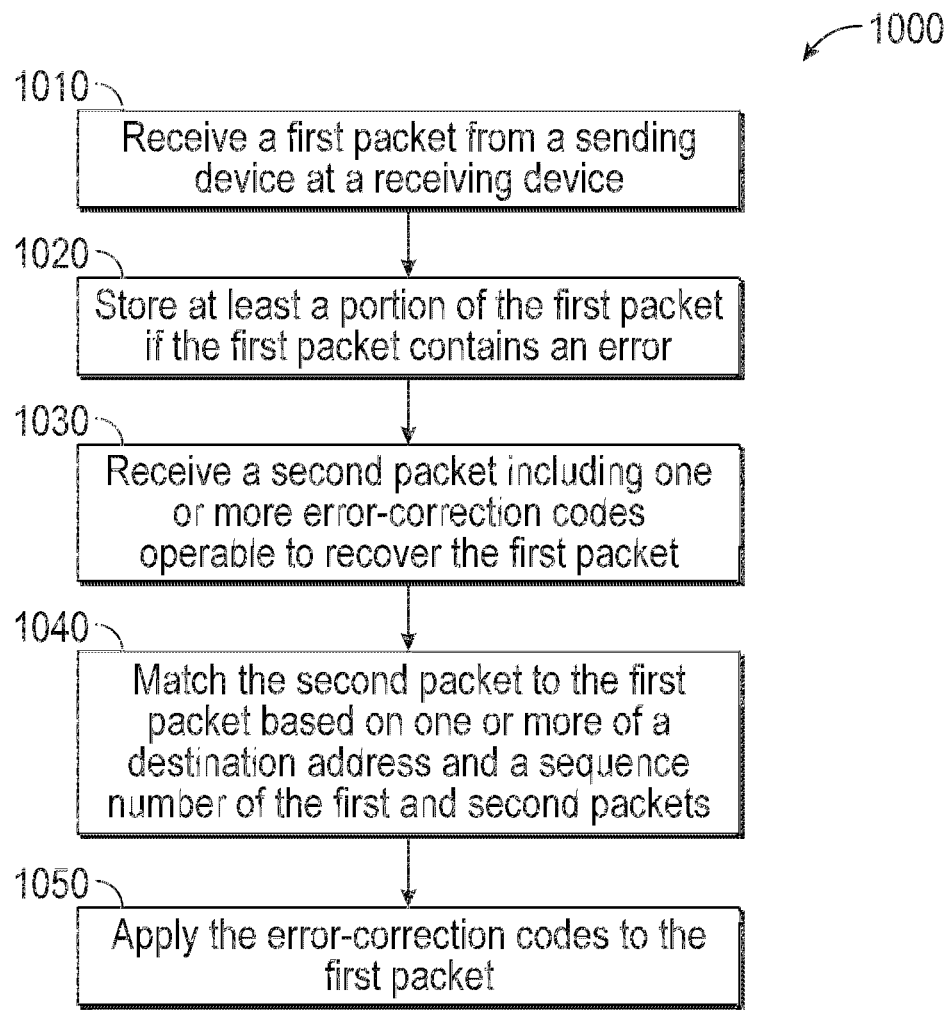
FIG. 10 shows a flowchart for an exemplary method of wireless communication that can be employed within the wireless communication system of FIG. 1.

FIG. 10 shows a flowchart for an exemplary method 1000 of wireless communication that can be employed within the wireless communication system 100 of FIG. 1. The method 1000 can be implemented in whole or in part by the devices described herein, such as the wireless device 702 shown in FIG. 7. Although the illustrated method 1000 is described herein with reference to the wireless communication system 100 discussed above with respect to FIG. 1, the communication exchange 300 discussed above with respect to FIG. 3, and the wireless device 702 discussed above with respect to FIG. 7, a person having ordinary skill in the art will appreciate that the illustrated method 1000 can be implemented by another device described herein, or any other suitable device. Although the illustrated method 1000 is described herein with reference to a particular order, in various embodiments, blocks herein may be performed in a different order, or omitted, and additional blocks may be added.

First, at block 1010, a receiving device receives a first packet from a sending device. For example, the RX STA 310 can receive the packet 320 from the TX STA 305. In an embodiment, the first packet can include one or more error-correction codes. In an embodiment, the first packet can include a portion of an A-MPDU encoded with raptor codes such as, for example, the A-MPDU 502 (FIG. 5).

Next, at block 1020, receiving device stores at least a portion of the first packet if the first packet includes an error. For example, the RX STA 310 can store a portion of the packet 320 if it is not properly decoded. In an embodiment, when the RX STA 310 encounters an error at a signal (SIG) field of the packet 320, or when comparing the received packet 320 to an FCS field, the RX STA 310 can store the entire PPDU of the packet 320 for later combination with additional error-correction codes. In some embodiments, the TX STA 310 can store the packet 320 without the STF. In another embodiment, when the RX STA 310 encounters an error when comparing the received packet 320 to an FCS field, the RX STA 310 can store the entire PSDU of the packet 320 for later combination with additional error-correction codes.

Then, at block 1030, the receiving device receives a second packet. The second packet can include one or more error-correction codes operable to recover the first packet. For example, the RX STA 310 can receive the new packet 370. The error-correction codes can include parity information. The error-correction codes can include forward error correction codes. The second packet can include a portion of the same A-MPDU as the first packet. The A-MPDU can be encoded with raptor codes. The second packet can include an indication that it is an error-correction packet.

Thereafter, at block 1040, the receiving device matches the second packet to the first packet based on one or more of a destination address and a sequence number of the first and second packets. In various embodiments, the receiving device matches the second packet to the first packet based on one of the destination address and the sequence number. For example, the RX STA 610 can match the new packet 370 to the packet 320 when it includes the same AID, partial AID, and/or sequence number. In other words, the receiving device can assume that the second packet includes error-correction information for the first packet due to identifying data in the first and second packets.

Subsequently, at block 1050, the receiving device applies the error-correction codes from the second packet to the first packet. For example, the RX STA 310 can apply the error-correction codes from the new packet 370 to the stored packet 320. In an embodiment, applying the error-correction codes can include forward error correction combination.

In an embodiment, the receiving device can transmit an advertisement that it supports error correction. For example, as described above with respect to FIG. 6, the RX STA 610 can transmit the HARQ advertisement 615 to the TX STA 605. Moreover, the receiving device can receive a confirmation of an error correction mode from the sending device. For example, the RX STA 610 can receive the HARQ confirmation 620 from the TX STA 605.

In an embodiment, the method shown in FIG. 10 can be implemented in an apparatus for wireless communication that can include means for receiving, means for storing, means for matching, and means for applying. Those skilled in the art will appreciate that an apparatus for wireless communication may have more components than the simplified apparatus described herein. The wireless device described herein includes those components useful for describing some prominent features of implementations within the scope of the claims.

The means for receiving can be configured to receive the first packet from the sending device. The means for receiving can include one or more of the receiver 712 (FIG. 7), the antenna 716 (FIG. 7), the processor 704 (FIG. 7), and the memory 706 (FIG. 7). The means for receiving can be further configured to receive the second packet.

The means for storing can be configured to store at least a portion of the first packet when the first packet includes an error. The means for storing can include, for example, one or more of the memory 706 (FIG. 7) and the processor 704 (FIG. 7).

The means for matching can be configured to match the second packet to the first packet based on one or more of a destination address and/or a sequence number of the first and second packets. The means for matching can include, for example, one or more of the memory 706 (FIG. 7) and the processor 704 (FIG. 7).

The means for applying can be configured to apply the error-correction codes to the first packet. The means for applying can include any processor or controller such as, for example, the processor 704 (FIG. 7) in conjunction with the memory 706 (FIG. 7).

Incorporation of HARQ Protocol in IEEE.802.11 Wireless Networks

Currently, the IEEE 802.11 family of wireless networking standards does not utilize the advantages of hybrid automatic repeat request (HARQ) protocols. Although they have been incorporated into other wireless communication systems, significant obstacles remain in their incorporation into IEEE 802.11. One source of the difficulty in incorporating HARQ into IEEE 802.11 is that rather than utilizing a medium access request/grant multiple access protocol, where a STA is assigned a time slot for communication, for example, IEEE 802.11 uses a carrier sense (CSMA/CA) multiple access protocol. This leads to special difficulties in managing ACK responses and matching packets to intended recipient STAs and previously transmitted packets for subsequent HARQ combining at the appropriate STA.

Implementations that utilize the existing ACK message of IEEE 802.11 to implement HARQ are described above. One problem with relying solely on ACK messages sent from a recipient RX STA to the TX STA in a HARQ protocol is that in some cases, the intended RX STA may not have received and stored the initial packet at all. In this case, no ACK is returned. If the TX STA assumes the RX STA received and stored a packet, but did not receive an ACK because the RX STA encountered errors in decoding, it may send one or more additional parity packets with FEC data that the RX STA cannot use. This results in unnecessary use of channel capacity.

Figure 11:
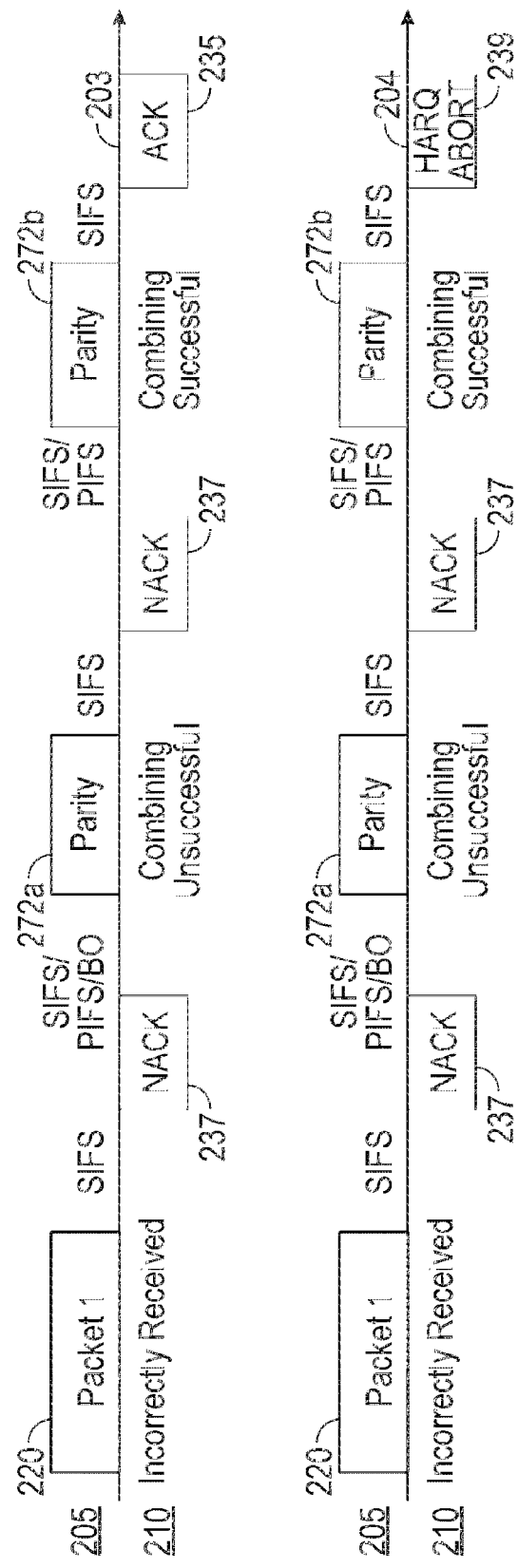
FIG. 11 shows two timelines for exemplary methods of wireless communication that can be employed within the wireless communication system of FIG. 1.

To help resolve this problem, as illustrated in FIG. 11, in some implementations, the RX STA 210 may transmit responses other than an ACK to TX STA 205. RX STA 210 may transmit a negative acknowledgment (NACK) 237 message when a packet is received with errors, and/or if a parity packet is not combined successfully. As described further below, the RX STA 210 may also transmit a HARQ ABORT to TX STA 205 to abort further attempts. Furthermore, the TX STA 205 may terminate the HARQ procedure with a HARQ ABORT message to the RX STA.

Implementations with a NACK 237 may improve communication efficiency. If only an ACK is utilized, the TX STA 205 does not know if the RX STA received the packet 220 with errors, stored the packet, and is awaiting a parity packet, or if the RX STA did not receive the packet at all. The NACK signal provides this information to the TX STA, indicating that the packet was received and stored, but errors are present, and that the RX STA is awaiting a parity packet to combine with the information currently stored.

Referring now to FIG. 11, in timeline 203, the RX STA 210 encounters an error decoding the packet 220 from TX STA 205. RX STA 210 can store the packet 220 and transmit a negative acknowledgement (NACK) 237 to TX STA 205. TX STA 205 waits for an ACK 235 or a NACK 237 from the RX STA 210. The TX STA 205 can be configured to wait for a first amount of time. For example, in the illustrated embodiment, the TX STA 205 waits for the duration of a short interframe space (SIFS). The RX STA 210 can be expected to transmit an ACK 235, or a NACK 237 at the end of the SIFS upon receipt of the packet 220. In timeline 203, RX STA 210 sends a NACK 237 to RX STA 210 indicating the packet 220 was received but contained errors. In response, TX STA 205 sends parity packet 272a to RX STA 210. RX STA 210 decodes the parity packet and attempts to combine the parity packet with one or more stored packets previously received from TX STA 205 corresponding to packet 220. In timeline 203, the RX STA 210 fails to successfully combine parity packet 272a with the previously received packet, and sends another NACK to TX STA 205. In response, the TX STA sends another parity packet 272b to the RX STA. With the additional parity packet 272b, the RX STA 210 successfully combines the parity data with the original packet 220, and sends an ACK 235 to the TX STA 205 acknowledging successful reception of the data in the packet. Repeats of the NACK and parity packet exchange can continue for several attempts.

Timeline 204 differs from timeline 203 in that combining one or more parity packets 272 with previously received packet 220 and one or more parity packets 272 is unsuccessful after multiple attempts. Timeline 204 depicts a case where a packet 220 and two parity packets are not successfully combined. After two tries, RX STA 210 sends a HARQ ABORT 239 message, and the TX STA 205 aborts sending parity packets 272 for this particular packet 220. RX STA 210 may configure criteria to determine when to issue a HARQ ABORT; for example based on a predefined number of attempts or based on an error detection criteria. In some implementations, the TX STA can send a HARQ ABORT message to the RX STA in response to a NACK, also terminating the HARQ protocol for that packet.

In conventional IEEE 802.11 protocols, the transmitted packet or PPDU includes a PHY header including one or more SIG fields and CRC check code for the PHY header, and one or more MPDUs, each including a MAC header, payload data, and another CRC check code for the MPDU. The RX STA can check for errors in the PHY header and the MPDU separately, and will discard the packet if an error is found in either one, and will send an ACK if no errors are detected in either. When implementing a HARQ protocol in this system, which involves storing packets with decoding errors and combining them with later transmitted packets to correct the errors as described above, difficulties arise because important information is present in the MAC header of the MPDU, including the MAC address of the intended recipient RX STA, and the sequence number of the MPDU being transmitted. The CRC of the MPDU is computed over both the payload data and the MAC header, so the if the RX STA detects errors, it may not know if the error is in the payload or the header, and therefore the decoded address and sequence number may be incorrect. This can, for example, result in multiple NACK messages being sent by different RX STAs in response to the same transmitted packet if different RX STAs produce errors in decoding the same packet. RX STAs that decode the packet without errors will be sure whether or not the packet is intended for them, as they can be confident of the MAC address decoded from the MAC header.

To resolve this issue, it is possible to place information important in operating the HARQ protocol in the SIG fields of the PHY header where more robust transmission can be implemented and a separate error check can be performed. In one implementation, a unique identifier of the intended recipient of each packet such as the MAC address of the recipient may be provided as part of the SIG fields in the PHY header. With this solution, if a RX STA receives a SIG field containing its unique identifier (e.g. MAC address) without errors, but the CRC check for the MPDU portion of the packet fails, it can send a NACK. If a STA receives a SIG field containing a unique identifier (e.g. MAC address) different from its own without errors, or receives a SIG field with errors, it can stop processing the packet at that point. In this way, a single STA will respond with a NACK.

As another alternative, a SIG field without a unique identifier can be used, but a polled protocol can be implemented where NACK messages are sent in response to a separate polling frame that includes the unique identifier such as the MAC address of the intended recipient. In one example implementation, if a STA receives a packet and finds errors in MPDU decoding, it may save the packet and wait. If the TX STA does not receive an ACK, it may send a polling frame that includes the MAC address of the intended recipient of the previous packet. If this polling frame is received without errors and the decoded MAC address matches the MAC address of the STA that stored the incorrectly decoded packet, it can send a NACK to the TX STA in response to the polling frame, informing the TX STA that the incorrectly decoded packet is stored and it is ready to receive a parity packet for combining with the stored packet. If the polling frame includes a different MAC address, the RX STA that stored the frame can discard it. Furthermore, if the stored packet is actually intended for another RX STA that decoded the packet without errors, this STA will send an ACK back to the TX STA, no polling frame will be sent, and the STA that stored the incorrectly decoded packet can discard the packet after a defined period in which no polling frame addressed to it is received.

It may also be noted that in addition to the MAC address in the MPDU, a smaller length "partial address identifier," which is generally assigned to each STA by the AP, but which is not necessarily unique, can be provided in one of the SIG fields, and currently is utilized in some versions of IEEE 802.11. This is typically used for power savings, as an STA can first decode the SIG field (which as noted above has its own CRC), and if the partial address identifier does not match the partial address identifier of the STA, the STA can conclude the packet is for a different STA, can stop processing the packet at that point, and can enter a low power mode for the packet duration (the packet duration is also provided in a SIG field). This partial address identifier can also be leveraged when implementing HARQ with NACK messages. Although not necessarily unique, the STA can save the packet and send a NACK when the partial address identifier matches the RX STA but the MPDU has errors in decoding. Although the partial address identifier is not necessarily unique, this can still substantially prevent duplicate NACKs (or a NACK and an ACK) sent by different STAs in response to the initial packet.

The parity packets 272a and 272b may include some or all of the original packet 220, and may include different FEC information. The fact that packets 272a and 272b are parity packets and the type of parity information being provided may be provided to the RX STA 210 as part of the parity packets 272. As with the unique identifier of the intended recipient STA as noted above, the identification of parity packet and type may be provided as part of one or more SIG fields of the PPDU packet header. The modulation type of the SIG symbols themselves may also be used to provide information to the RX STA that the packet being received is a parity packet and the type of parity present in the packet. Such information may include an index indicating that the parity packet is the Nth parity packet for combining with a previously transmitted packet.

When implementing HARQ, the RX STA may also utilize information for matching a received parity packet 272 with an original packet 220 that the parity packet may be combined with for decoding. To perform this matching, transmitted PPDUs may include a PSDU identifier in a SIG field of the PHY header along with the recipient identifier as described above. The original packet will have a sequence number assigned to it which is transmitted in the MAC header of the original packet, and this sequence number can, in some implementations, be provided in a SIG field of the original packet as well, which allows the RX STA to reliably assign an identifier to the PPDU since the sequence number in the MAC header cannot be relied upon because of the presence of MPDU decoding errors. The parity packets can repeat the same sequence number in their own SIG field, so that the RX STA can match the parity packet with the original packet for combining and error correction. In other respects, the parity packets 272 may be sent with the same signaling as a normal PPDU frame with a payload including the data for combining, which may include a retransmission of some or all original data in the first packet, additional parity data, or both depending on the HARQ/FEC technique being implemented in the decoding process.

The PSDU identifier in the SIG field may be omitted if a stop and wait ARQ method is used for each packet wherein the TX STA and the RX STA continue communicating until either the RX STA successfully decodes the packet and sends an ACK to the TX STA or the process terminates with packet failure and the RX STA flushes its stored packet(s). In this case, the parity packets will be understood to correspond to the last packet received with errors and stored at the RX STA. The nature of the content of each successive parity packet sent in response to a NACK may also be pre-agreed between the TX STA and RX STA. If the polled protocol for requesting NACK messages described above is used with this stop-and-wait style ARQ for each packet, little to no modification to existing 802.11 PHY header fields is needed to implement HARQ in IEEE 802.11 protocols.

The above described implementations use the SIG fields in the PHY header to reliably transmit HARQ signaling information from the TX STA to the RX STA, which may be seen in some ways as transferring some information currently provided in the MAC header to the PHY header. Another implementation can instead modify the existing IEEE 802.11 MAC header to possibly utilize robust low rate codes for at least the information useful to HARQ management in the MAC header portion of the MPDU and include a separate MAC header or partial MAC header CRC so this data can be error checked independently from the rest of the MPDU. Existing MAC header fields can then be used to manage the HARQ procedure, such as the existing MAC addresses, Frame type and Subtype fields in the Frame Control Field, and the MPDU sequence control field. To minimize modifications to the existing MPDU structure of IEEE 802.11 while implementing HARQ in this manner, it may be possible to split the existing four byte MPDU CRC (which is computed over both the MPDU payload and the header) into separate portions that are dedicated separately to header and payload error detection.

The above description is directed mainly to packets containing a single MPDU. Operation with aggregated MPDUs (e.g. as shown in FIGS. 4 and 5) in a single PPDU can be handled similarly to a single MPDU packet but with additional signaling to potentially handle correction of a failed portion of the PPDU. In one implementation, where the RX STA cannot determine the number and size of failed MPDUs between correctly decoded MPDUs, the RX STA can store the samples corresponding to the bytes received in between the MPDUs that passed the CRC check. A block acknowledgement message can be returned to the TX STA which identifies these bytes and the TX STA can send one or more parity packets for these bytes, which can then be combined with the saved bytes to decode the failed portion of the PPDU.

In another implementation, if the aggregated MPDUs include robust delimiters and MAC headers that can be reliably decoded and error checked, the RX STA may be able to identify specifically which MPDU's failed and can indicate to the TX STA the identity of these MPDUs in a block acknowledge message. In this case, a parity MPDU can be sent for each failed MPDU, and these can be matched to the failed MPDU's stored in the RX STA based on sequence number and parity type for combining in the RX STA.

Figure 12:
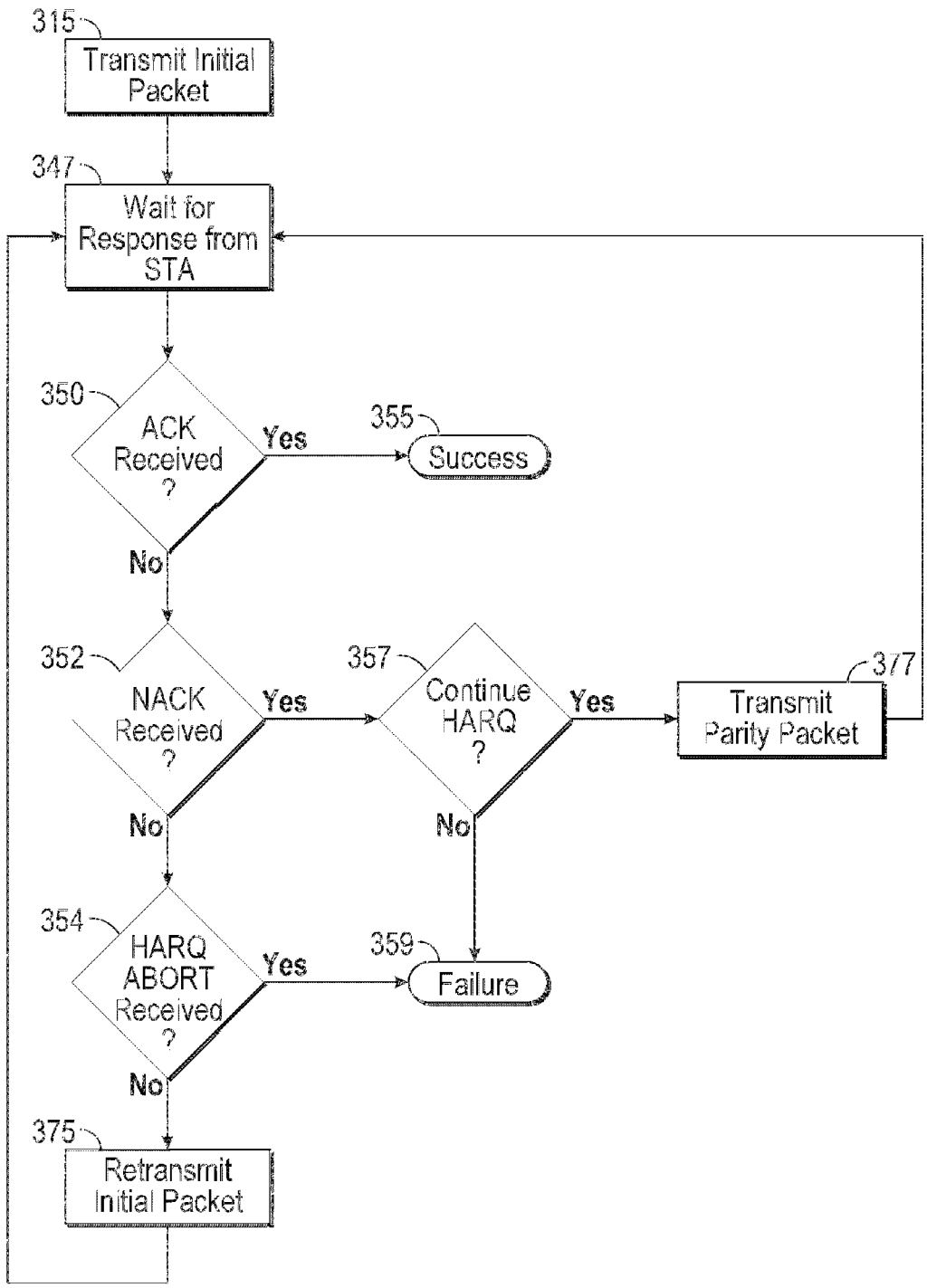
FIG. 12 shows a flowchart for an exemplary method of wireless communication that can be employed within the wireless communication system of FIG. 1.
Figure 13:
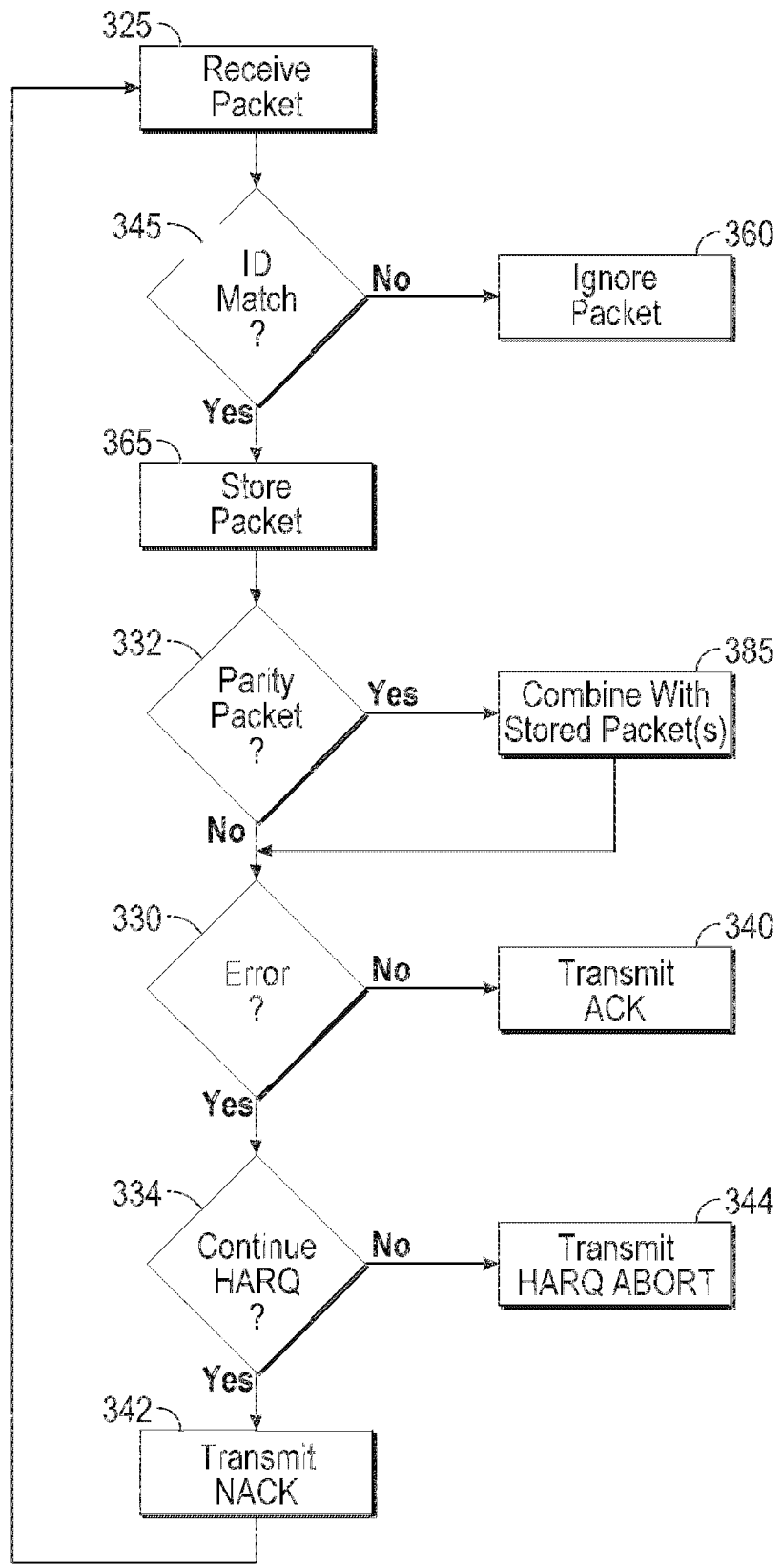
FIG. 13 shows a flowchart for an exemplary method of wireless communication that can be employed within the wireless communication system of FIG. 1.

FIG. 12 shows exemplary transmitter communication operations in the wireless communication system of FIG. 1. FIG. 13 shows exemplary receiver communication operations in the wireless communication system of FIG. 1. These Figures further illustrate the communication protocols of FIG. 11. Blocks in these FIGS. 12 and 13 that correspond to blocks above in FIG. 3 are designated with the same designation numbers.

In various embodiments, the TX STA can include any of the AP 104 and/or the STAs 106a-106d, described above with respect to FIG. 1. Likewise, the RX STA can include any of the AP 104 and/or the STAs 106a-106d, described above with respect to FIG. 1.

As shown in FIG. 12 and FIG. 13, the TX STA 205 and the RX STA 210 can separately implement aspects of an error-control method. The illustrated method can facilitate reliable data transmission between the TX STA 205 and the RX STA 210 using packet data to match packets for error-correction. The method can be implemented in whole or in part by the devices described herein, such as the wireless device 702 shown in FIG. 7. Although the illustrated method is described herein with reference to a particular order, in various embodiments, blocks herein may be performed in a different order, or omitted, and additional blocks may be added.

First, at FIG. 12, block 315, the TX STA 205 transmits an initial packet (not shown; packet transmitted from FIG. 12 block 315 to FIG. 13 block 325) to the RX STA 210. In various embodiments, the packet can include one or more of a PPDU, PSDU, MPDU, and MSDU. The packet can include an error detection code, such as a frame check sequence (FCS) or a cyclic redundancy check (CRC). In some embodiments, the packet can include one or more parity bits, and/or error-correction codes such as, for example, forward error-correction (FEC) Reed-Solomon codes. The parity bits can be referred to the coded PPSU, PSDU, or to each coded MPDU or MSDU.

The packet can include an explicit indication that the packet is protected by error-correction codes. For example, the packet can include the indication in one or more SIG fields, in a robust portion of a MAC header, etc. In some embodiments, error-correction can be implicit. For example, the RX STA 210 can assume that all packets at a given modulation and coding scheme (MCS), such as the lowest, are protected with error-correction codes, that all packets are eligible for error-correction, etc. In various embodiments, the RX STA 210 can exchange management information with the TX STA 205, which can indicate that all or certain packets are eligible for error correction.

The packet can further include a robust destination indication. For example, the packet can include a low-rate MAC header including a destination address. The low-rate MAC header can include an independent error detection and/or correction code. As another example, the packet can include a physical layer (PHY) preamble including the destination address. In some embodiments, the retransmission of error-correction information may be applied to aggregated MPDUs (A-MPDUs) where at least one MPDU has been correctly decoded, so that the address was correctly received. In various embodiments, all MPDUs in an A-MPDU can have same destination address, so the RX STA 210 can obtain the address by decoding a single MPDU.

The packet can further include a robust sequence indication. The packet can further include an indication that it is a data packet, as opposed to an error-correction packet or other retransmission. For example, parity packets can be indicated in the PHY preamble or using a retry bit in the MAC header. In an embodiment the packet can omit the parity indication.

Next, at FIG. 13, block 325, the RX STA 210 receives the packet. The RX STA 210 can detect the packet based on a training sequence, such as a short training field (STF). In some embodiments, the packet 210 can include a signal (SIG) field. In some embodiments, the packet can include an FCS field.

Then, at FIG. 13, block 345, the RX STA 210 determines whether the packet is addressed to the RX STA 210. In the illustrated embodiment, the STA 210 checks the destination of the packet (such as the robust destination indication in the MAC header or PHY, as discussed above) against the association ID (AID) of the RX STA 210. In some embodiments, a partial AID at the PHY layer can be used. If the AID or partial AID does not match, the RX STA 210 can ignore the packet at block 360. On the other hand, if the AID or partial AID matches, the RX STA 210 can store the packet at block 365. In an embodiment, when the RX STA 210 encountered an error at a signal (SIG) field of the packet, or when comparing the received packet to an FCS field, the RX STA 210 can store the entire PPDU of the packet for later combination with additional error-correction codes. In some embodiments, the TX STA 205 can store the packet without the STF. In another embodiment, when the RX STA 210 encountered an error when comparing the received packet to an FCS field, the RX STA 210 can store the entire PSDU of the packet for later combination with additional error-correction codes.

Next, at FIG. 13, block 332, the RX STA 210 determines whether the packet is a parity packet. If it is, it combines the parity packet with previously received stored packet(s) at block 385.

Then, at block 330, the RX STA 210 determines whether the received packet was successfully decoded. For example, when receiving the packet, the RX STA 210 may encounter an error at the SIG field of the packet. In some circumstances, the TX STA 205 may encounter an error when verifying the FCS field. If the RX STA 210 decodes the packet without error, at block 340 it can transmit an ACK to the TX STA 205, received at FIG. 12, block 347.

Next, at block 332, the RX STA 210 determines whether to continue HARQ. If continuing HARQ, The RX STA 210 transmits a NACK 237 message at block 342 to FIG. 13, block 347. If not, the RX STA 210 transmits a HARQ ABORT message at block 344 to FIG. 12, block 347.

Meanwhile, at FIG. 12, block 347, the TX STA 205 waits for a response from the RX STA 210. The TX STA 205 can be configured to wait for a first amount of time. For example, in the illustrated embodiment, the TX STA 205 waits for the duration of a short interframe space (SIFS). The RX STA 210 can be expected to transmit the ACK 335 at the end of the SIFS upon successful receipt of the packet. In some embodiments, the first amount of time can be the PIFS, or any other timing greater than the PIFS. When the packet includes robust addressing, the first amount of time can be dynamic, and need not be preset or prearranged.

Subsequently, at blocks 350, 352, and 354 the TX STA 205 determines whether it received an ACK, NACK, or HARQ ABORT response from RX STA 210, respectively. An ACK signifies successful transmission, in block 355. A HARQ ABORT indicates that the RX STA 210 requests an end to the HARQ process for the current packet, and transmission failure at block 359. The TX STA 205 processes a NACK by first determining whether to continue with HARQ in box 357. If not, the TX STA 205 ends the HARQ process for the current process, signifying transmission failure in box 359. If the TX STA 305 opts to continue HARQ, the TX STA 305 transmits a parity packet in box 377 to RX STA 310 in FIG. 3B, box 325.

If the TX STA 310 receives neither ACK 235, NACK 237, nor HARQ ABORT 239 during the response period, TX STA 205 retransmits the initial packet in box 375 to RX STA 210 in FIG. 13, box 325.

Figure 14:
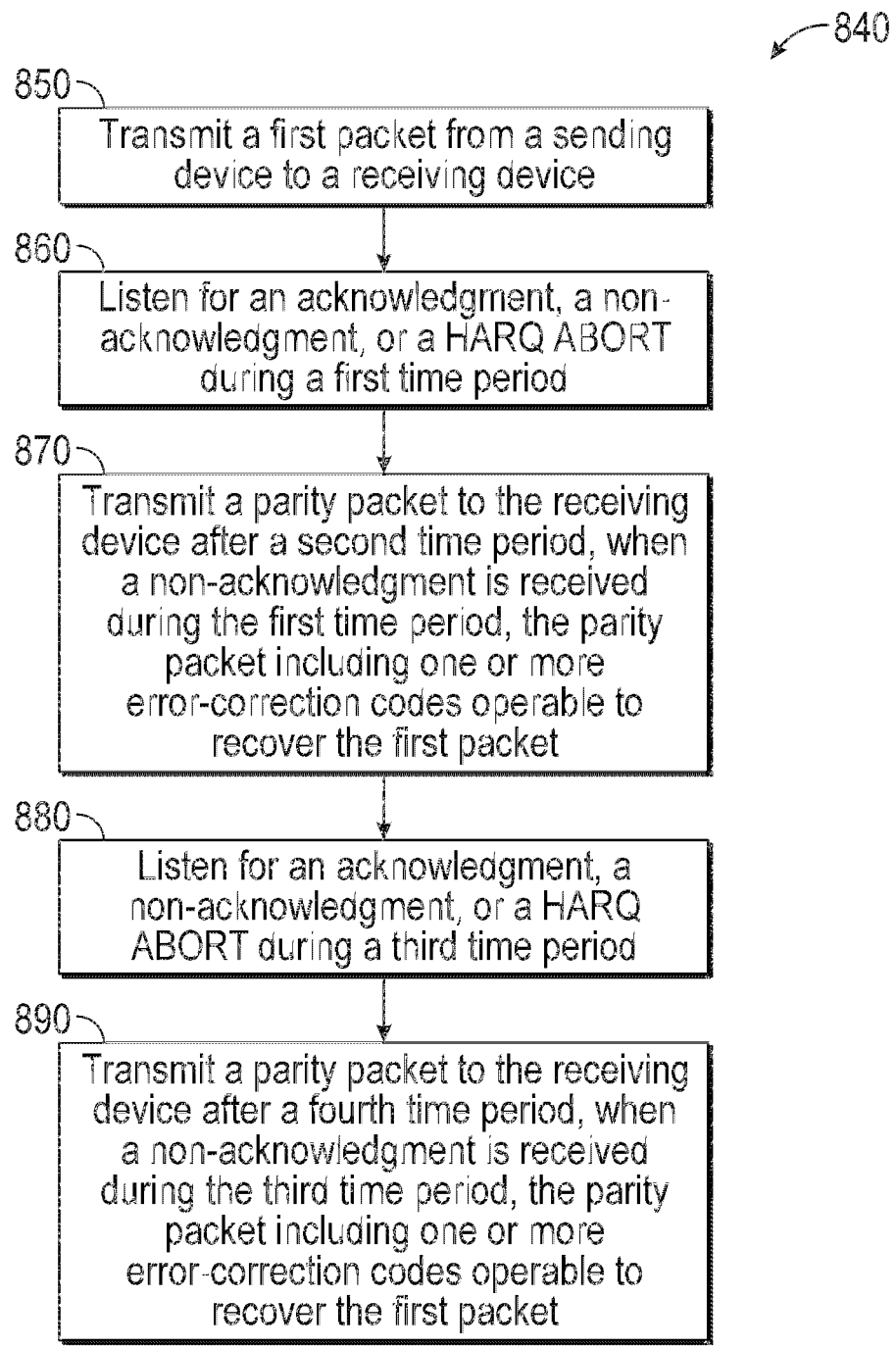
FIG. 14 shows a flowchart for an exemplary method of wireless communication that can be employed within the wireless communication system of FIG. 1.

FIG. 14 shows a flowchart for an exemplary method 840 of wireless communication that can be employed within the wireless communication system 100 of FIG. 1. The method 840 can be implemented in whole or in part by the devices described herein, such as the wireless device 702 shown in FIG. 7. Although the illustrated method 840 is described herein with reference to the wireless communication system 100 discussed above with respect to FIG. 1, the communication exchanges 200 and 300 discussed above with respect to FIGS. 2-3, and the wireless device 702 discussed above with respect to FIG. 7, a person having ordinary skill in the art will appreciate that the illustrated method 800 can be implemented by another device described herein, or any other suitable device. Although the illustrated method 800 is described herein with reference to a particular order, in various embodiments, blocks herein may be performed in a different order, or omitted, and additional blocks may be added.

First, at block 850, a sending device transmits a first packet to a receiving device. For example, the TX STA 205 can transmit the packet 220 to the RX STA 210. In an embodiment, the first packet can include one or more error-correction codes. In an embodiment, the first packet can include a portion of an A-MPDU encoded with raptor codes such as, for example, the A-MPDU 502 (FIG. 5).

Next, at block 860, the sending device listens for an acknowledgement, a non-acknowledgement, or a HARQ abort during a first time period. For example, the TX STA 205 can wait for the ACK 235, NACK 237, or HARQ ABORT 239 during the SIFS. If the TX STA 205 receives the ACK 235 or the HARQ ABORT 239, the TX STA 205 may not send additional error correction information.

Then, at block 870, when a non-acknowledgement is received during the first time period, the sending device can transmit a priority packet to the receiving device during a second time interval. The priority packet includes one or more error-correction codes operable to recover the first packet. For example, the TX STA 205 can transmit the priority packet 272 to the RX STA 210 after the PIFS.

Next, at block 880, the sending device listens for an acknowledgement, a non-acknowledgement, or a HARQ abort during a third time period. For example, the TX STA 205 can wait for the ACK 235, NACK 237, or HARQ ABORT 239 during the SIFS. If the TX STA 205 receives the ACK 235 or the HARQ ABORT 239, the TX STA 205 may not send additional error correction information.

Then, at block 890, when a non-acknowledgement is received during the third time period, the sending device can transmit a priority packet to the receiving device during a fourth time period. The priority packet includes one or more error-correction codes operable to recover the first packet. For example, the TX STA 205 can transmit the priority packet 272 to the RX STA 210 after the PIFS.

In an embodiment, the second time period can include the PIFS. The error-correction codes can include parity information. The error-correction codes can include forward error correction codes. The second packet can include a portion of the same A-MPDU as the first packet. The A-MPDU can be encoded with raptor codes. The second packet can include an indication that it is an error-correction packet.

Various aspects of the novel systems, apparatuses, and methods are described herein with reference to the accompanying drawings. The teaching's disclosure can, however, be embodied in many different forms and may not be construed as limited to any specific structure or function presented throughout this disclosure. Rather, these aspects are provided so that this disclosure will fully convey the scope of the disclosure to those skilled in the art. Based on the teachings herein, one skilled in the art will appreciate that the scope of the disclosure is intended to cover any aspect of the novel systems, apparatuses, and methods disclosed herein, whether implemented independently of or combined with any other aspect disclosed. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It may be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in the memory 706 (FIG. 7)) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, the DSP 720 (FIG. 7) (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. The processor 704 (FIG. 7) can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above may also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it may be appreciated that modules and/or other appropriate means for performing the methods and processes described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and processes described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of communicating in a wireless system, comprising:
   receiving a first packet at a first time, the first packet being received from a sending device at a receiving device;
   storing at least a portion of the first packet if the first packet includes an error;
   receiving a second packet at a second time, the second time occurring after the first time by a predetermined duration, the second packet comprising one or more error-correction codes operable to recover the first packet, wherein the predetermined duration comprises a point coordination function (PCF) interframe space (PIFS), and wherein the first packet comprises portions of an aggregated media access control protocol data unit (A-MPDU) encoded with raptor codes, and the second packet comprises portions of the same A-MPDU;
   matching the second packet to the first packet based on the second time occurring after the first time by the predetermined duration; and
   applying the error-correction codes of the second packet to the first packet based on the matching.

2. The method of claim 1, further comprising transmitting an acknowledgement to the sending device.

3. The method of claim 1, wherein the error-correction codes comprise parity information.

4. The method of claim 1, wherein the first packet comprises one or more error-correction codes.

5. The method of claim 1, wherein the second packet comprises an indication that the packet is an error-correction packet.

6. The method of claim 1, further comprising:
   transmitting an advertisement that the receiving device supports error correction; and
   receiving a confirmation of an error correction mode from the sending device.

7. A device configured to communicate in a wireless system, comprising:
   a receiver configured to receive a first packet at a first time, the first packet being received from a sending device;
   a memory configured to store at least a portion of the first packet if the first packet includes an error,
   the receiver further configured to receive a second packet at a second time, the second time occurring after the first time by a predetermined duration, the second packet comprising one or more error-correction codes operable to recover the first packet, wherein the predetermined duration comprises a point coordination function (PCF) interframe space (PIFS), and wherein the first packet comprises portions of an aggregated media access control protocol data unit (A-MPDU) encoded with raptor codes, and the second packet comprises portions of the same A-MPDU, and
   the device further comprising one or more processors configured to:
      match the second packet to the first packet based on the second time occurring after the first time by the predetermined duration; and
      apply the error-correction codes of the second packet to the first packet based on the matching.

8. The device of claim 7, wherein the device is configured to transmit an acknowledgement to the sending device.

9. The device of claim 7, the error-correction codes comprising parity information.

10. The device of claim 7, the first packet comprising one or more error-correction codes.

11. The device of claim 7, the second packet comprising an indication that the packet is an error-correction packet.

12. The device of claim 7, wherein:
   the device is further configured to transmit an advertisement that the device supports error correction; and
   the receiver is further configured to receive a confirmation of an error correction mode from the sending device.

13. An apparatus for communicating in a wireless system, comprising:
   means for receiving a first packet at a first time, the first packet being received from a sending device at a receiving device;
   means for storing at least a portion of the first packet if the first packet includes an error;
   means for receiving a second packet at a second time, the second time occurring after the first time by a predetermined duration, the second packet comprising one or more error-correction codes operable to recover the first packet, wherein the predetermined duration comprises a point coordination function (PCF) interframe space (PIPS), and wherein the first packet comprises portions of an aggregated media access control protocol data unit (A-MPDU) encoded with raptor codes, and the second packet comprises portions of the same A-MPDU;
   means for matching the second packet second time occurring after the first time by the predetermined duration; and
   means for applying the error-correction codes of the second packet to the first packet based on the matching.

* * * * *